(12) United States Patent
Chandrasekaran et al.

(10) Patent No.: US 12,492,356 B2
(45) Date of Patent: Dec. 9, 2025

(54) OXA-SANDALWOOD-TYPE FRAGRANCE COMPOUNDS

(71) Applicant: SYMRISE AG, Holzminden (DE)

(72) Inventors: Vijayanand Chandrasekaran, Holzminden (DE); Bernd Hölscher, Halle (DE)

(73) Assignee: SYMRISE AG, Holzminden (DE)

( * ) Notice: Subject to any disclaimer, the term of this patent is extended or adjusted under 35 U.S.C. 154(b) by 609 days.

(21) Appl. No.: 17/913,961

(22) PCT Filed: Apr. 20, 2020

(86) PCT No.: PCT/EP2020/061029
§ 371 (c)(1),
(2) Date: Sep. 23, 2022

(87) PCT Pub. No.: WO2021/213627
PCT Pub. Date: Oct. 28, 2021

(65) Prior Publication Data
US 2023/0126581 A1    Apr. 27, 2023

(51) Int. Cl.
| | | |
|---|---|---|
| *C11B 9/00* | (2006.01) |
| *C07C 41/01* | (2006.01) |
| *C07C 43/178* | (2006.01) |
| *C07C 47/198* | (2006.01) |
| *C07C 47/277* | (2006.01) |

(52) U.S. Cl.
CPC .............. *C11B 9/003* (2013.01); *C07C 41/01* (2013.01); *C07C 43/1781* (2013.01); *C07C 47/198* (2013.01); *C07C 47/277* (2013.01); *C11B 9/0049* (2013.01); *C07C 2601/08* (2017.05); *C07C 2601/10* (2017.05); *C07C 2602/18* (2017.05)

(58) Field of Classification Search
None
See application file for complete search history.

(56) References Cited

U.S. PATENT DOCUMENTS

| | | | |
|---|---|---|---|
| 4,052,341 A | 10/1977 | Naipawer et al. |
| 4,610,813 A | 9/1986 | Schulte-Elte et al. |

FOREIGN PATENT DOCUMENTS

| | | | |
|---|---|---|---|
| EP | 0155591 A2 | 9/1985 |
| EP | 0203528 A2 | 12/1986 |
| EP | 0801049 A2 | 10/1997 |
| EP | 0829463 A2 | 3/1998 |
| WO | 2008052379 A2 | 5/2008 |

OTHER PUBLICATIONS

Chapuis et al., Preparation of Campholenal Analogues: Chiroans for the Lipophilic Moiety of Sandalwood-Like Odorant Alcohols, 1992, Helvetica Chimca Acta, vol. 75, 1527-1546 (Year: 1992).*

Bajgrowicz, Jerzy A. et al., "Synthesis and Structure Elucidation of a New Potent Sandalwood-Oil Substitute," Helvetica Chimica Acta, 1998, vol. 81,pp. 1349-1358.

Chapuis, Christian, et al., "Preparation of Campholenal Analogues: Chirons for the Lipophilic Moiety of Sandalwood-Like Odorant Alcohols," Helvetica Chimica Acta, 1992, vol. 75, No. 5, pp. 1527-1546.

International Search Report issued in International Application No. PCT/EP2020/061029, dated Jan. 14, 2021.

Written Opinion issued in International Application No. PCT/EP2020/061029, dated Jan. 14, 2021.

"Result of Consultation" issued Nov. 22, 2024, in connection with corresponding European Patent Application.

Marianne Vialemaromge et.al., "Isomerization of functional 2,3-eQOxypinanes in the presence of Lewis acids," Nov. 1, 1999, 14 pages in Helvetica Chimica Acta—vol. 83, publised in Switzerland.

Brunner, G., et al. "Transition-Metal-Catalyzed Cyclopropanation of Nonactivated Alkenes in Dibromomethane with Triisobutylaluminum," Eur. J. Org. Chem., vol. 2011, No. 24, pp. 4623-4633 (published online Jun. 2011).

Office Action in corresponding Japanese Patent Application No. 2022-563878, drafted Nov. 5, 2023.

Office Action in corresponding Indian Patent Application No. 202217063909 dated Mar. 15, 2023.

\* cited by examiner

*Primary Examiner* — Jessica Whiteley
(74) *Attorney, Agent, or Firm* — United IP Counselors, LLC

(57) ABSTRACT

The present invention relates to novel fragrance compounds of general formula (I) which exhibit a Sandalwood-like fragrance and which are derivable from campholenic aldehyde derivates according to general formula (II). Furthermore, the present invention discloses compositions comprising one or more of the inventive fragrance compounds. The invention also relates to the use of such compounds or fragrance compositions comprising one or more of the compounds according to the invention as an odorant or or improving the fixation of a fragrance compound or a fragrance composition. Furthermore, the present invention refers to the use of such compounds or compositions for the preparation of a perfumed products as well as perfumed products as such.

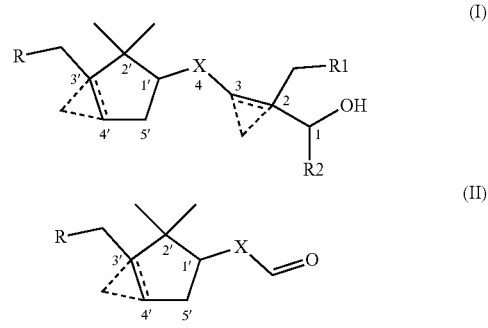

16 Claims, No Drawings

OXA-SANDALWOOD-TYPE FRAGRANCE COMPOUNDS

FIELD OF THE INVENTION

The invention is in the field of fragrances and concerns fragrance compounds and composition with a natural sandalwood-like note, preparations containing these fragrances or fragrance mixtures, and the use of these new fragrance compounds and compositions to produce a sandalwood-like scent note.

The present invention relates to novel fragrance compounds of general formula (I) which exhibit a sandalwood-like fragrance and which are derivable from campholenic aldehyde derivates according to general formula (II). Furthermore, the present invention discloses compositions comprising one or more of the inventive fragrance compounds. The invention also relates to the use of such compounds or fragrance compositions comprising one or more of the compounds according to the invention as an odorant or for improving the fixation of a fragrance compound or a fragrance composition. Furthermore, the present invention refers to the use of such compounds or compositions for the preparation of a perfumed products as well as perfumed products as such.

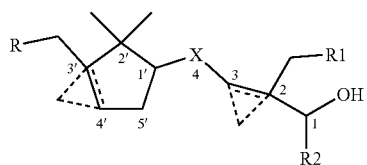

Formula (I)

PRIOR ART

There is sustained interest within the fragrance industry for new fragrance compounds.

In addition, there is also a constant demand for already known odorous substances that enjoy great popularity, but are difficult and inefficient to access. As an example, sandalwood oil should be mentioned here.

Sandalwood is one of the oldest known and popular fragrance materials. It was originally produced in India, Ceylon and Indonesia.

However, sandalwood oil, a natural oil with a characteristic long lasting and powerful sweet and woody odor, is usually extracted by distillation, especially by steam distillation, of heartwood of the sandalwood trees which must be at least 30 years old in view of cost-efficiency as the obtained total oil yield ranges approximately only between 4 to 6.5% relative to the required amount of wood which is used for the production via steam distillation.

Furthermore, natural sandalwood oil is a stable fixative, making sandalwood oil even more popular in the perfume and cosmetics industry, so that there is generally a very high demand for new fragrances with comparable primary and secondary olfactory properties (such as tenacity, low odor threshold value, impact, i.e. odor intensity and substantivity).

In the course of the last decades, however, the natural resources of East Indian sandalwood (lat. *Santalum album*), an evergreen tropical tree, have drastically declined due to the high worldly demand for sandalwood oil leading the wood now being recognized as vulnerable, so that today's sandalwood oil is primarily extracted from Australian sandalwood (lat. *Santalum spicatum*). However, in view of the long period of growth it can be assumed that these resources for the production of sandalwood oil will soon be exhausted, too, and sandalwood as the raw material of the essential oil will accordingly become scarce worldwide, so that the high demand cannot be sufficiently satisfied.

Furthermore, the oil extracted from Australian sandalwood tress contains remarkably lower amounts of santalol compared to the oil extracted from East Indian sandalwood trees, the constituent mainly responsible for the characteristic odor with woody and creamy nuances, and also contains additional constituents altering the characteristic sandalwood note, resulting in balsamic-woody notes and a rather dry-bitter, slightly resinous topnote compared to the essential oil obtained by steam distillation of East Indian sandalwood.

In order to meet the high demand in the future as well, a large number of synthetically produced fragrances with a comparable odor profile are offered today. However, many of these synthetic fragrances are not suitable for simultaneous use as fixatives as they often show insufficient tenacity. Furthermore, previous studies in view of the relation of the structural aspect and the resulting odor revealed that the sandalwood odor is rather sensitive to structural details and thus to slight structural changes.

Such synthetic fragrance compounds are for example: (i) 2-methyl-4-(2',2',3'-trimethyl-3'-cyclopenten-1'-yl)-butan-1-ol (Brahmanol®, Symrise AG), (ii) 2-ethyl-4-(2',2',3'-trimethyl-3'-cyclopenten-1'-yl)-2-buten-1-ol (Sandranol®, Symrise AG), (iii) 3-methyl-5-(2',2',3'-trimethyl-3'-cyclopenten-1'-yl)-4-penten-2-ol (Ebanol®, Givaudan S.A.), (iv) 3,3-dimethyl-5-(2',2',3'-trimethyl-3'-cyclopenten-1'-yl)-4-penten-2-ol (Polysantol®, Firmenich S.A.), (v) 3-methyl-5-(2,2,3-trimethylcyclopent-3-enyl)pentan-2-ol (Sandalore®, Givaudan S.A.), (vi) 2-methyl-4-(2,2,3-trimethylcyclopent-3-en-1-yl)pent-4-en-1-ol (Firsantol®, Firmenich S.A.) or (vii) 2-methyl-4-(2,2,3-trimethyl-3-cyclopenten-1-yl)but-2-en-1-ol (Madrol®, Symrise AG).

In EP 0203528 B1 lower boiling diastereomers of (E)-3-methyl-5-(2,2,3-trimethylcyclopent-3-en-1-yl)-pent-4-en-2-ol were described which exhibit intense creamy, woody, musk, sandalwood odor and which could be derived from campholenic aldehyde.

EP 0829463 B2 discloses the preparation of the optically active compound (E)-(R)-2-alkyl-4-(2,2,3-trimethylcyclopent-3-en-1-yl)-2-buten-1-ol which has a fine sandalwood-like odor, and the use of this compound in perfume composition as well as in various cosmetics, fragrances, toiletries, and other hygienic goods.

Further, a variety of structurally related compounds, has been disclosed in EP 0801049 A2, such as 3-Methyl-5-(1,2,2-trimethylbicyclo[3.1.0]hex-3-yl)pentan-2-ol or 2,3-Dimethyl-4-(1,2,2-trimethylbicyclo[3.1.0]hex-3-yl)butan-1-ol, wherein most of these compounds exert a sandalwood odor, but some are also just woody/amber-like.

U.S. Pat. No. 4,052,341 A discloses a composition of 3-methyl-5-(2,2,3-trimethyl-cyclopent-3-en-1-yl)pentan-2-ol and 6-(2,2,3-trimethylcyclopent-3-en-1-yl)hexan-3-ol possesses a strong, precious woody odor reminiscent of sandalwood oil.

U.S. Pat. No. 4,610,813 A refers to derivates of campholene aldehyde, such as (−)-(E)-3,3-dimethyl-5-(2',2',3'-trimethyl-3'-cyclopenten-1'-yl)-4-penten-2-ol exhibiting an odor profile comparable to sandalwood oil and which find application for the preparation of perfumes and perfumed products.

WO 2008/052379 A2 refers to cyclopropanated 2,2,3-trimethylcyclopentane derivatives which possess a natural sandalwood oil odor.

Often, α-campholene aldehyde (2,2,3-trimethyl-3-cyclopenteneacetaldehyde, $C_{10}H_{16}O$) serves as starting material for these so-called "campholene sandalwood" aroma chemicals such as Brahmanol® (2-methyl-4-(2,2,3-trimethyl-3-cyclopenten-1-yl)butanol; Symrise AG). However, none of these compounds derived from campholenic aldehyde fully achieves a natural sandalwood-like fragrance impression accompanied tenacities comparable to natural sandalwood oil.

The quest for synthetic substances smelling like sandalwood is presently high. However, additionally, there is a high need for new fragrance compounds with comparable primary and secondary olfactory properties such as tenacity, low odor threshold value, impact, i.e. odor intensity and substantivity, preferably being superior to the properties of natural sandalwood oil in order to satisfy the high demand.

The object of the present invention is thus to provide new fragrance compounds having a natural woody sandalwood-like fragrance impression which are easily accessible and have a low odor threshold value and high inherent intensity accompanied by a long tenacity, excellent fixative properties, elevated impact and substantivity, therefore being equal or even superior to the sandalwood fragrance substances known from the prior art, while simultaneously being harmless to the environment.

It has now been surprisingly found that the new campholenic aldehyde derivatives according to the general formula (I) have a pronounced natural and intense sandalwood oil odor along with low odor threshold values and long tenacities, thus exhibiting excellent primary and secondary olfactory properties.

SUMMARY OF THE INVENTION

In a first aspect, the present invention relates to a compound of general formula (I):

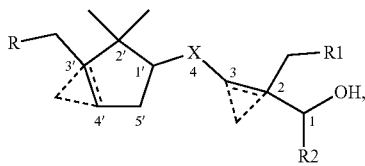

Formula (I)

wherein
R represents an ether group, preferably a methoxy group (—OMe),
R1 represents a hydrogen atom or an alkyl group, preferably R1 represents a hydrogen atom or a methyl group,
R2 represents a hydrogen atom or an alkyl group, preferably R2 represents a hydrogen atom or a methyl group, and
X represents a $CH_2$ group or $C=CH_2$ group;
wherein the chain marked as C1 to C4 is either saturated or is unsaturated and contains one double bond either between C2 and C3 or between C3 and C4;

wherein at the position of the dotted lines in the chain between C2 and C3 there is either a noncyclic C—C single bond between C2 and C3, a C=C double bond between C2 and C3 or a cyclopropane ring encompassing C2 and C3; and wherein at the position of the other dotted lines between C3' and C4' in the 5-C ring there is either a C—C single bond between C3' and C4', a C=C double bond between C3' and C4' or a cyclopropane ring encompassing C3' and C4';

or a stereoisomer thereof, preferably an enantiomer thereof;

or a mixture of any of the above compounds or a mixture of any of the above stereoisomers.

In a second aspect, the present invention relates to a compound according to general formula (II):

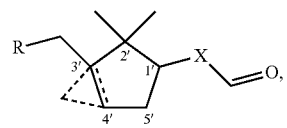

Formula (II)

wherein
R represents an ether group, preferably a methoxy group (—OMe), and
X represents a $CH_2$ group or $C=CH_2$ group;
wherein at the position of the dotted lines between C3' and C4' in the 5-C ring there is either a C—C single bond between C3' and C4', a C=C double bond between C3' and C4' or a cyclopropane ring encompassing C3' and C4';

or a stereoisomer thereof, preferably an enantiomer thereof;

or a mixture of any of the above compounds or a mixture of any of the above stereoisomers.

In a third aspect, the present invention relates to the use of a compound of general formula (II) for preparing the compounds of general formula (I) or their stereoisomers, in particular enantiomers.

In another aspect, the present invention relates to a fragrance composition comprising at least one compound according to the invention and at least one further fragrance substance.

In yet another aspect, the present invention relates to the use of a compound or a fragrance composition comprising at least one compound according to the invention as an odorant or for improving the fixation of a fragrance compound or for the preparation of a perfumed product.

Finally, the present invention relates to a perfumed product comprising a compound according to the present invention, or the fragrance composition comprising at least one compound according to the invention in an effective amount, and a carrier or substrate.

DETAILED DESCRIPTION OF THE INVENTION

In accordance with the invention, the above object is achieved by a compound of general formula (I):

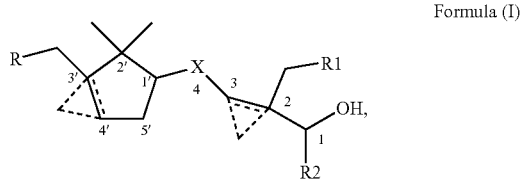

Formula (I)

wherein
R represents an ether group, preferably a methoxy group (—OMe),
R1 represents a hydrogen atom or an alkyl group, preferably R1 represents a hydrogen atom or a methyl group,
R2 represents a hydrogen atom or an alkyl group, preferably R2 represents a hydrogen atom or a methyl group, and
X represents a $CH_2$ group or $C=CH_2$ group;
wherein the chain marked as C1 to C4 is either saturated or is unsaturated and contains one double bond either between C2 and C3 or between C3 and C4;
wherein at the position of the dotted lines in the chain between C2 and C3 there is either a noncyclic C—C single bond between C2 and C3, a C=C double bond between C2 and C3 or a cyclopropane ring encompassing C2 and C3; and
wherein at the position of the other dotted lines between C3' and C4' in the 5-C ring there is either a C—C single bond between C3' and C4', a C=C double bond between C3' and C4' or a cyclopropane ring encompassing C3' and C4';
or a stereoisomer thereof, preferably an enantiomer thereof;
or a mixture of any of the above compounds or a mixture of any of the above stereoisomers.

The compounds of formula (I) have an outstanding and unique odor profile which, among other things, has woody sandalwood-like notes. In addition, the compounds according to the invention convince by an extraordinarily good tenacity (long lasting) and a high substantivity.

The chain marked as C1 to C4 in the general formula (I) is defined as a four-carbon chain, wherein said chain is preferably the n-butyl chain —X—$CH_2$—$CH_2$—$CH_2$— which connects at the terminal carbon atom of the group X (i.e. the carbon atom marked as C4) to the cyclopentane ring and at the other terminal carbon atom of the chain (i.e. the carbon atom marked as C1) to an hydroxy group (—OH group).

Thereby, the group X of the four carbon-chain preferably represents a $CH_2$ group or a $C=CH_2$ group which is bound to the cyclopentane ring at the position 1' of the 5-C ring. In the cases wherein X represents a $C=CH_2$ group, the tertiary C-atom is the C-atom indicated as C4 in the four-carbon chain marked as C1 to C4.

However, best olfactory results were achieved for embodiments of formula (I), wherein X represents a $CH_2$ group. Therefore, X preferably represents a $CH_2$ group.

These compounds generally exhibit a more pronounced sandalwood-like, woody note, in high intensities and with enhance tenacity.

Thereby, the chain marked as C1 to C4 is either saturated or is unsaturated and contains one C=C double bond either between the C-atoms marked as C2 and C3 or one C=C double bond between the C-atoms marked as C3 and C4.

If the four-carbon chain C1 to C4 is unsaturated and contains one C=C double bond between the C-atoms marked as C3 and C4, the group X represents a $CH_2$ group.

Furthermore, the compounds of general formula (I) exhibit, either a noncyclic C—C single bond between the C-atoms marked as C2 and C3, a C=C double bond between C2 and C3 or a cyclopropane ring encompassing the atoms marked as C2 and C3 at the position of the dotted lines in the butyl chain between the C-atoms indicated with C2 and C3. Herein, the dotted lines are the most concise way of expressing these options in the above structural formula. The three dotted lines between the C-atoms marked as C2 and C3 in the general formula (I) may thus stand optionally for a double bond at these positions, or a cyclopropane ring encompassing these positions, or no extra function in the case of a non-cyclic single bond between the atoms C2 and C3. i.e. the dotted lines can be ignored, and we simply have a single bond, which forms a C—C bond between the C-atoms marked as C2 and C3. This meaning is also evident from the examples shown below and the experimental section.

In cases wherein there is either a C=C double bond between the C-atoms marked as C2 and C3 or a cyclopropane ring encompassing these atoms C2 and C3 at the position of the dotted lines in the butyl chain marked as C1 to C4 between C2 and C3, there is preferably no double bond between the C-atoms marked as C3 and C4, i.e. the above indicated general formula (I) preferably does not disclose allene functionalities.

However, it was surprisingly found, that both, unsaturated butyl-chains in general, and saturated chains exhibiting non-cyclic single bonds between the C-atoms marked as C2 and C3, work especially well in order to achieve the desired sandalwood-like note.

Preferably, the chain marked as C1 to C4 is unsaturated and contains one double bond. These compounds exhibiting an unsaturated butyl chain, achieve a more typical and natural sandalwood note with high intensities while showing outstanding tenacities. However, in these cases, the C=C double bond is preferably positioned between the C-atoms marked as C2 and C3 resulting in more intense and characteristic sandalwood-like odor profiles.

Therefore, a particularly preferred embodiment of the present invention describes a compound of general formula (I), wherein at the position of the dotted lines in the chain between the C-atoms marked as C2 and C3 there is a C=C double bond.

In general formula (I), the groups R1 and/or R2 represent a hydrogen atom and/or an alkyl group independently from each other.

Preferably, the alkyl group is selected from the group consisting of a methyl group or a higher straight or branched alkyl chain such as for example an ethyl, propyl, n-butyl or iso-butyl group.

Moreover, in a compound of general formula (I), R1 preferably represents a hydrogen atom or a methyl group and/or R2 preferably represents a hydrogen atom or a methyl group independently from each other, both of which were found to work well to achieve the desired sandalwood-like fragrance. However, especially preferred are embodiments wherein R1 represents a methyl group, due to the resulting superior olfactory properties.

In a preferred embodiment the alkyl group of R1 and/or R2 is a methyl group, in order to achieve the most natural and strongest sandalwood-like, woody odor impression.

In general formula (I), R represents an ether group, such as methoxy, ethoxy, propoxy or a higher straight or branched ethoxy group. However, R preferably represents a methoxy group (—OMe), resulting in enhanced secondary properties such as intensity and tenacity.

None of the previously reported fragrance compounds derived from campholene aldehyde are reported to show a methoxy group. As previous studies regarding the structural relation to the resulting odor revealed that the sandalwood odor is rather sensitive to structural changes, it is particularly surprising that the above indicated compounds according to the invention reveal such an natural sandalwood fragrance impression in a remarkable intensity and superior tenacity.

Furthermore, it was found, that longer ether chains result in decreasing olfactory properties and reduced environmental compatibility due to increased log $K_{OW}$ values.

The substituents R, R1 and R2 can have the functionalities indicated above. However, it was found that best olfactory results were achieved when R represents a methoxy group. Therefore, another preferred embodiment of the present invention concerns compounds of formula (I), wherein R1 represents a methoxy group.

It was further found, that R2 should preferably represent a hydrogen atom, resulting in a more sandalwood-like odor profile. Thus, a further particularly preferred embodiment of the present invention concerns compounds of formula (I), wherein R2 represents a hydrogen atom.

It was further observed that an alkyl group such as methyl, ethyl or propyl and the like at the position R1 causes intense sandalwood fragrances. In particular such an advantageous effect was observed in cases where R1 represents a methyl group.

Consequently, compounds of general formula (I), wherein R represents a methoxy group, R1 represents a methyl group and R2 represents a hydrogen atom were found to exhibit the most beneficial olfactory properties in view of tenacity, intensity and comparability to the olfactory profile of natural sandalwood.

Furthermore, the compounds of general formula (I) exhibit either a C—C single bond between the C-atoms marked as C3' and C4', a C=C double bond between C3' and C4' or a cyclopropane ring encompassing the C-atoms C3' and C4' at the position of the other dotted lines between the C-atoms marked as C3' and C4' in the 5-C ring as indicated in formula (I). These variants are present independently of the characteristics of the butyl chain C1 to C4, which may have the above-defined structural attributes, respectively. Again, the dotted lines are the most concise way of expressing these options in the above structural formula. The three dotted lines between the C-atoms marked as C3' and C4' in the formula (I) may thus stand optionally for a C=C double bond at these positions, or a cyclopropane ring encompassing these positions, or no extra function in the case of a non-cyclic C—C single bond between the atoms C3' and C4', i.e. the dotted lines can be ignored, and we simply have a C—C single bond in the cyclopentane ring between the C-atoms marked as C3' and C4'. This meaning is also evident from the examples shown below.

In another preferred embodiment the compounds of general formula (I) preferably show a C=C double bond at the position of the dotted lines in the 5-C ring between the C-atoms marked as C3' and C4', resulting in a more natural sandalwood-like and intensive odor with high tenacity.

Preferably, if the butyl chain C1 to C4 is unsaturated, then the cyclopentane ring contains a C=C double bond, too, preferably in position C3'/C4' of the cyclopentane ring. In a more preferred variant thereof, the compound of general formula (I) exhibits a double bond which is preferably positioned between the C-atoms marked as C2 and C3 of the butyl chain C1 to C4.

In yet another variant, the cyclopentane ring is monocyclopropanated, as depicted by the dotted lines in formula (I). In this case, there is preferably a cyclopropane ring formed with two corners in the positions C3' and C4' of the cyclopentane ring.

In a further preferred variant both positions indicated by dotted lines can represent a cyclopropane functionalization.

In a still further preferred variant, the compound of general formula (I) comprises at least two C=C double bonds in the overall molecule.

In another further preferred embodiment of the resent invention and the compounds of general formula (I), R represents an ether group, preferably a methoxy group (—OMe), R1 represents a hydrogen atom or an alkyl group, preferably R1 represents a hydrogen atom or a methyl group, R2 represents a hydrogen atom or an alkyl group, preferably R2 represents a hydrogen atom or a methyl group, and X represents a $CH_2$ group or C=$CH_2$ group; wherein the chain marked as C1 to C4 is either saturated or is unsaturated and contains one double bond either between C2 and C3 or between C3 and C4; wherein at the position of the dotted lines in the chain between C2 and C3 there is either a noncyclic C—C single bond between C2 and C3, a C=C double bond between C2 and C3 or a cyclopropane ring encompassing C2 and C3; and wherein at the position of the other dotted lines between C3' and C4' in the 5-C ring there is either a C—C single bond between C3' and C4' or a cyclopropane ring encompassing C3' and C4'; or a stereoisomer thereof, preferably an enantiomer thereof.

In a further embodiment a common characteristic feature of the compounds of general formula (I) is, that they comprise at least one cyclopropane function in either the butyl chain C1 to C4 encompassing the atoms C2 and C3 and/or the cyclopentane ring encompassing the atoms C3' and C4' and/or at least one C=C double bond in the butyl chain C1 to C4 between the C-atoms marked as C2 and C3 or between the C-atoms marked as C3 and C4 and/or the C-atoms C3' and C4' of the cyclopentane ring.

In a preferred variant, the compounds of general formula (I) comprise at least one, preferably at least two, functional groups selected from the groups consisting of:
(a) cyclopropane rings and
(b) double bonds.

In one alternative embodiment, the at least two functional groups are either all cyclopropane rings or all C=C double bonds. However, in general C=C double bonds are preferred due to the enhanced olfactory properties achieving a typical sandalwood fragrance of the resulting synthetic fragrance compounds.

The compounds of general formula (I) generally exhibit a chiral center at the position of the C-atom marked as C1' of the cyclopentane ring and as such may exist as isomerically pure forms or in any mixture of the corresponding stereoisomers, in particular enantiomers. Consequently, whenever reference is made in the present description to a compound of formula (I), this is deemed to refer to all stereoisomers, in particular to all enantiomers, indifferently to the isomerically pure stereoisomers or mixtures of any of their stereoisomers. For economic reasons it is preferred to use the compounds as mixtures of their stereoisomers, in particular mixtures of their enantiomers.

The compounds of general formula (I) are thus preferably present in the form of:
(a) a pure optically active enantiomer;
(b) a racemic mixture of the enantiomers; or
(c) an optically active mixture of various enantiomers.

Furthermore, the present invention discloses a mixture of any of the above compounds and/or a mixture of any of the above stereoisomers as well as the use of such compounds and/or mixtures in the meaning of the present application.

Therefore, in the context of the present invention, the term "compounds of formula (I)" means both, the individual compounds of formula (I) as well as all mixtures of the compounds of formula (I) in any mixing ratio. That is to say, statements in the following description concerning "compounds of formula (I)" apply both, to a single compound of formula (I) and to mixtures consisting of or comprising compounds of formula (I) in any mixing ratio.

The compounds of formula (I) as defined above according to the invention may also be present as stereoisomers. In the context of the present invention, the term "stereoisomers" refers to all possible diastereomers or enantiomers of the compounds of general formula (I).

Furthermore, the definition of the compounds of formula (I) also includes mixtures of stereoisomers, in particular also racemates or enantiomerically enriched mixtures, as well as their enantiomerically pure forms.

Therefore, the present invention relates to the compounds according to the invention as such individually or also mixtures of the compounds according to the invention.

The olfactory impression imparted by the compounds of formula (I) is characterized by an outstanding naturalness and intensity, especially with regard to the sandalwood, woody note accompanied by high tenacities.

In another preferred embodiment, the compound of the general formula (I) is selected from the group consisting of the following compounds and their stereoisomers, in particular also the enantiomers and mixtures thereof as specified in Table 1:

TABLE 1

Preferred compounds according to general formula (I) and the present invention.

| Compound No. | Structure |
|---|---|
| 1 | |
| 1a | |
| 2 | |
| 3 | |

TABLE 1-continued

Preferred compounds according to general formula (I) and the present invention.

| Compound No. | Structure |
|---|---|
| 4 | |
| 5 | |
| 6 | |
| 7 | |
| 8 | |

Surprisingly, the compounds according to the invention have an intense and long-lasting sandalwood-like, woody notes resembling of natural sandalwood essential oil, making only small amounts of the inventive compounds required in order to achieve a radiant, attractive and natural woody sandalwood note. Further, these compounds can be easily and economically prepared, therefore, being able to fully cover the perfume industry's need for sandalwood fragrances.

The structure of the above preferred compounds according to general formula (I) and according to the invention has been verified via NMR measurements. The according data is provided in the experimental section (see below).

It was found, that the above-mentioned compounds of general formula (I) exhibit a specific odorous property, in particular an intensive sandalwood-like odor profile with intensities exceeding the intensities of commercial and structurally-related fragrance compounds such as Brahmanol® (2-methyl-4-(2,2,3-trimethyl-3-cyclopenten-1-yl)butanol; Symrise AG), which is described to exhibit a woody, tenacious sandalwood odor with a slight musk nuance and which is prepared based on a condensation of α-campholene aldehyde and propanal.

In particular, the new alcohols described by general formula (I) exhibit a strong, radiant, woody, sandalwood note, which strongly resembles the complex and characteristic odor profile of natural sandalwood while showing a high degree of tenacity.

Among the novel compounds of general formula (I), those compounds exhibiting a C=C double bond between the C-atoms marked as C3' and C4' in the 5-C ring exhibit a particular distinctive natural sandalwood note.

Generally, compounds 1 to 8 exhibit olfactory properties which can be assigned to the sandalwood, woody family of odors as indicated in the experimental section. Surprisingly, it has been found that the compounds of formula (I) and in particular compounds 1 to 8, impart an olfactory impression which is very close to the complexity of the natural woody odor profile of sandalwood.

Surprisingly, it was found that in particular the compounds of formula (I), and in particular compounds 1 to 8, are suitable as sandalwood-like fragrances. These compounds show additionally superior secondary properties, such as an elevated tenacity, a low odor threshold value, elevated impact (odor intensity), as well as an elevated substantivity.

Among the above compounds specified in Table 1, especially compounds 1 to 4 are of particular interest. These compounds are able to impart an outstandingly powerful, i.e. intense and tenacious natural sandalwood note compared to other, commercially available materials exhibiting a sandalwood-like odor such as Brahmanol® (Symrise AG) as indicated in Table 2 and the above synthetic fragrance compounds being superior to the natural in uniformity, stability and availability.

The odor detection threshold (in the following abbreviated as "ODT") is defined as the lowest concentration of a certain odorous compound (gaseous, sensorially active substance) which is perceivable and thus which can be distinguished with certainty from a blank reference under standard conditions. Generally, lower ODT values are preferred as a lower amount of the fragrance compound is required in order to a achieve strong odor impressions and thus lower amounts can be used for perfuming. However, as the threshold depends on various factors such as concentration, solubility, partition coefficient between air and the olfactory active substance, vapor pressure, polarity, molecular mass etc., predictions referring to the ODT of a substance are difficult to make.

Table 2 indicates the ODT values of preferred embodiment in comparison to commercially available Brahmanol® (Symrise AG) and Sandranol® (Symrise AG). The ODT was measured using an olfactometer TO8 and a panel of at least four experts according to DIN standard EN 13725. According to the DIN standard EN 13725, the odor threshold value is defined as the concentration of an odorous substance at which, under defined test conditions, the probability of perceiving the sample is 0.5, i.e. 50% of the test persons indicate an odor perception. Thereby, the quantitative ODT value is given as the ratio of volume fractions of an odor-free comparison matrix, such as air, to the examined matrix at which the odor could just be perceived, i.e. a dilution factor.

TABLE 2

Comparison of the ODT values of compounds 1 to 4 according to formula (I) and commercially available Brahmanol ® and Sandranol ® (Symrise AG).

| Compound No. | ODT in air [ng/l] | ODT [ppm (v/v)] |
| --- | --- | --- |
| 3 | 7.7 | 0.0019 |
| 2 | 7.6 | 0.00285 |
| 4 | 7.6 | 0.0025 |
| 1 | 7.1 | 0.0089 |
| Brahmanol ® | 6.9 | 0.0173 |
| Sandranol ® | 7.6 | 0.000205 |

Surprisingly, it was found that the compounds of general formula (I) emanate a woody and natural sandalwood fragrance impression with high strength (relative intensity of a fragrance impression).

According to Table 2, the olfactory impression imparted by the compounds of formula (I), and in particular of compounds 1 to 4, is characterized by an outstanding naturalness and high intensity.

Tenacity (the so-called lasting effect), a secondary but indeed important property of fragrance compounds, which is also known as adsorptive capacity, describes a compound's ability to adhere to a substrate. Therefore, tenacity describes the ability of a perfume to last, or a fragrance note to retain its characteristic odor. Tenacity thus typically refers to the long-term effectiveness of the fragrance in a perfumed product such as when applied on the skin after use e.g. of a shower gel/toilet soap/deodorant. Generally, it is preferred that fragrance compound exhibit a long odor tenacity, i.e. that the odor of the corresponding fragrance compound last as long as possible without losing its odor characteristics. Substantivity describes the ability of a substance to be adsorbed from a usually aqueous phase onto a substrate or also its ability to remain on a substrate after a washing or rinsing operation. This effect is in particular manifested on substrates such as skin, hair and textile fibers (for example cotton, linen, wool and/or synthetic fibers). Tenacity is measured over a defined period of time and refers to samples adhered to a blotting-paper substrate in a defined amount, concentration, temperature and humidity and which are tested by a single member or a panel of experts. The tenacity refers to the time until which the odor can no longer be detected. Initially, for the first day the tenacity is measured hourly, thereafter in days.

Generally, high tenacities are preferred in order to achieve a "long-lasting" effect, i.e. the emission of a pleasant odor over a long period of time and thus slow diffusion from the skin.

TABLE 3

Comparison of the tenacity of compounds 1 to 3 according to formula (I).

| Compound No. | Tenacity |
| --- | --- |
| 3 | 22 d |
| 2 | 25 d |
| 1 | 55 d |

According to Tables 2 and 3, the above compounds exhibit an intensive sandalwood-like odor, remaining uniform for a considerable length of time due to the outstanding tenacity and substantivity of these compounds.

Therefore, among the above novel compounds specified in Table 1, compounds 1 to 4 are preferred due to their property to exhibit the most natural, the strongest and the most persistent sandalwood odor based on their high threshold intensity and superior tenacity, being superior to any existing synthetic, commercially available materials exhibiting a sandalwood odor, such as Brahmanol® (Symrise AG). However, compound 3 (2-ethyl-4-[3-(methoxymethyl)-2,2-dimethyl-cyclopent-3-en-1-yl]but-2-en-1-ol) is particularly preferred, showing the best olfactoric properties of the above indicated compounds as demonstrated in Tables 2 and 3.

In comparison to the commercially available sandalwood fragrance substance Brahmanol® (Symrise AG), compound 3 exhibits a substantially lower threshold value, which is reduced by the factor of about 10, and thus shows a higher inherent intensity. Hence, lower amounts of the compound are necessary to result in an intense, radiant, natural woody sandalwood note and lower amounts are required for perfuming.

Furthermore, compounds 1 to 3 show excellent tenacities.

Compound 2 and commercially available Brahmanol® (Symrise AG) both can be derived from general formula (I): In both compounds the groups R1 and R2 are hydrogen atoms and the chain marked as C1 to C4 is saturated, i.e. exhibiting a noncyclic C—C single bond at the position of the dotted lines in the chain between the C-atoms marked as C2 and C3 of the butyl chain (no extra function of the dotted lines). Furthermore, in both compounds a C═C double bond between the C-atoms marked as C3' and C4' in the 5-C ring is present. However, while R is hydrogen in Brahmanol® (Symrise AG), R stands for an ether group, in particular a methoxy group, in compound 2.

Also compound 3 and commercially available Sandranol®, Symrise AG) both can be derived from general formula (I): In both compounds the groups R1 and R2 are methyl groups and hydrogen atoms, respectively, and the chain marked as C1 to C4 is unsaturated and contains one C═C double bond at the position of the dotted lines in the chain between the C-atoms marked as C2 and C3 of the butyl chain. Furthermore, in both compounds a C═C double bond between the C-atoms marked as C3' and C4' in the 5-C ring is present. However, while R is hydrogen in Sandranol® (Symrise AG), R stands for an ether group, in particular a methoxy group, in compound 3.

As shown in Tables 2 and 3, compounds 2 and 3 show superior threshold values, in particular the ODT value being lower by a factor of 3 for compound 2, while simultaneously exhibiting outstanding tenacities, qualifying the compound of general formula (I) as outclassing fragrance materials, combining high odor intensities and excellent fixative properties imparting the long lasting qualities of the inventive fragrance compounds.

The fixative properties of the inventive compounds lead to a retardation of the volatilization of the fragrance compounds, i.e. the longevity of more volatile components is enhanced, resulting in a uniform volatilization and thus in a uniform fragrance impression upon evaporation creating a long lasting and definite odor effect. The property of being able to act as a "fixative" (fixative properties) means that the corresponding compound brings about tenacity of other odoriferous substances.

Based on the high tenacities of the inventive compounds it is possible to achieve a uniform fragrance impression which retains its character over a longer period of time.

This advantageous and surprising effect is based on the presence of the ether group (indicated as R) at the 3' position of the 5-C ring.

Consequently, based on the present invention, it is possible to obtain fragrance compounds and compositions thereof which give quite characteristic and harmonious odors and which retain their pleasing and characteristic odors over a considerable period of time without changing remarkably. Besides the imparted remarkable longevity, compound according to formula (I) are even more effective than the botanical sandalwood oil as fixative.

Based on the determined log $K_{OW}$ values it is, therefore, possible to estimate how quickly and likely the corresponding material will accumulate in the fatty tissue of living organisms. More hydrophobic chemicals, i.e. chemicals exhibiting higher log $K_{OW}$ values, generally are more likely to accumulate in living organisms (i.e. their fatty tissue) and thus in the environment while more water-soluble substances are excreted faster and usually exhibit a lower bioaccumulation potential. Therefore, generally, substances exhibiting low log $K_{OW}$ values are preferred.

Surprisingly it was found that the compounds according to formula (I) exhibit excellent log $K_{OW}$ values and thus a low bioaccumulation potential qualifying the inventive compounds derived from general formula (I) as highly environmentally sustainable fragrance materials. Especially compound of formula (I) wherein R represents a methoxy group are favorable.

The compounds of general formula (I) are derivable from compounds related to campholenic aldehyde exhibiting a 5-C ring.

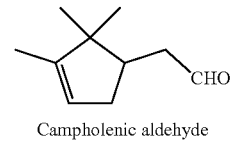

Campholenic aldehyde

These compounds which are used for the synthesis of the above-mentioned fragrance compounds are indicated by general formula (II).

Therefore, another aspect of the present invention refers to a compound according to general formula (II):

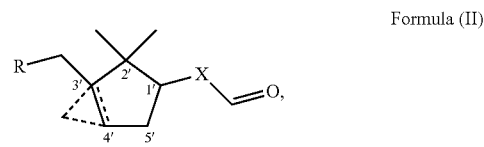

Formula (II)

wherein
R represents an ether group, preferably a methoxy group (—OMe), and
X represents a CH$_2$ group or C═CH$_2$ group;
wherein at the position of the dotted lines between C3' and C4' in the 5-C ring there is either a C—C single bond between C3' and C4', a C═C double bond between C3' and C4' or a cyclopropane ring encompassing C3' and C4';
or a stereoisomer thereof, preferably an enantiomer thereof;
or a mixture of any of the above compounds or a mixture of any of the above stereoisomers.

The above-mentioned preferred variants of X, R, and in view of the functions indicated by the dotted lines between the C-atoms marked as C3' and C4' for the general formula (I) are also preferred for the configuration of the invention according to formula (II).

Thereby, the group X of the four carbon-chain preferably represents a CH$_2$ group or a C═CH$_2$ group which is bound to the cyclopentane ring at position 1' of the ring.

In cases wherein X represents a C═CH$_2$ group, the tertiary C-atom is the C-atom indicated as C4 in the chain marked as C1 to C4.

However, best olfactory results were achieved for embodiments of formula (I), wherein X represents a CH$_2$ group. These compounds generally can be used to produce compounds of general formula (I) exhibiting pronounced sandalwood-like fragrance impressions along with enhance tenacities.

Furthermore, the compounds of general formula (II) exhibit either a C—C single bond between the C-atoms marked as C3' and C4', a C=C double bond between C3' and C4' or a cyclopropane ring encompassing the C-atoms C3' and C4' at the position of the dotted lines between the C-atoms marked as C3' and C4' in the 5-C ring as indicated in formula (II). Again, the dotted lines are the most concise way of expressing these options in the above structural formula. The three dotted lines between the C-atoms marked as C3' and C4' in the formula (I) may thus stand optionally for a C=C double bond at these positions, or a cyclopropane ring encompassing these positions, or no extra function in the case of a non-cyclic C—c single bond between the atoms C3' and C4', i.e. the dotted lines can be ignored, and we simply have a C—C single bond in the cyclopentane ring between the atoms C3' and C4'. This meaning is also evident from the examples shown below as well as the experimental section.

In another preferred embodiment, and based on the beneficial properties of compounds 1 to 4, the compounds of general formula (II) preferably show a C=C double bond at the position of the dotted lines in the 5-C ring between the C-atoms marked as C3' and C4', resulting in compounds of formula (I) exhibiting a more natural sandalwood-like and intensive fragrance impression.

In general formula (II), R represents an ether group, such as methoxy, ethoxy, propoxy or a higher straight or branched ethoxy group, independently from the structural configuration of the ring structure.

It was found that best olfactory results in view of intensities and tenacity were achieved where R represents a methoxy group. Therefore, R preferably represents a methoxy group (—OMe).

Furthermore, preferably the compounds of general formula (II) do not comprise the compound 2-[3-(methoxymethyl)-2,2-dimethyl-cyclopent-3-en-1-yl]acetaldehyde or its stereoisomers:

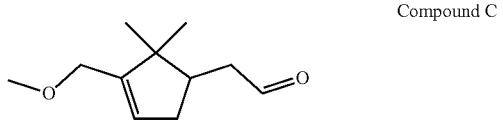

Compound C

However, it should be mentioned, that this compound has not been described regarding its olfactory properties yet. In the context of the present invention, it has been found, that the above compound exhibits aldehydic, milky, almondy and pistachio notes. Therefore, this compound can be similarly used for perfuming purposes and as fragrance compound or in fragrance compositions. The sensory properties of this compound, and in particular its suitability as a fragrance with a special note, were not known until now. The use of that compound as a fragrance is therefore also subject of the present invention.

However, another preferred starting material for the production of the compounds according to formula (I) is the alcohol derivate 2-[3-(methoxymethyl)-2,2-dimethyl-cyclopent-3-en-1-yl]ethanol (compound D) represented by formula (III), exhibiting a fresh, woody, fruity and citrus odor profile:

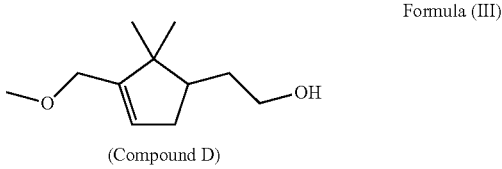

(Compound D)

It is known that campholenic aldehyde can occur in an optically active form or in any mixture of its stereoisomers as a function of the particular isomerism of the alpha-pinene used as the starting material for preparing it. This implies that the compounds derived from campholenic aldehyde can also occur in different stereoisomeric forms.

In yet another preferred embodiment of the present invention the compounds of general formula (II) preferably exhibit either a C—C single bond between the C-atoms marked as C3' and C4' or a cyclopropane ring encompassing these C-atoms C3' and C4'. It was found that these compounds exhibit extraordinary olfactory properties.

Therefore, another embodiment descries compounds of general formula (II), wherein R represents an ether group, preferably a methoxy group (—OMe), and X represents a $CH_2$ group or C=$CH_2$ group; wherein at the position of the dotted lines between C3' and C4' in the 5-C ring there is either a C—C single bond between C3' and C4' or a cyclopropane ring encompassing C3' and C4'; or a stereoisomer thereof, preferably an enantiomer thereof; or a mixture of any of the above compounds or a mixture of any of the above stereoisomers.

The compounds of general formula (II) or formula (III) generally exhibit a chiral center at the position of the C-atom marked as C1' of the cyclopentane ring and as such may exist as isomerically pure forms or in any mixture of the corresponding stereoisomers, in particular enantiomers. Consequently, whenever reference is made in the present description to a compound of formula (II) or formula (III), this is deemed to refer to all stereoisomers, in particular to all enantiomers, indifferently to the isomerically pure stereoisomers or mixtures of any of their stereoisomers. For economic reasons it is preferred to use the compounds as mixtures of their stereoisomers, in particular mixtures of their enantiomers.

For economic reasons it is preferred to use the compounds as mixtures of their stereoisomers, in particular mixtures of their enantiomers. However, if it is desired to prepare individual stereoisomers, this may be achieved according to methods known in the art, e.g. preparative HPLC, GC, or by departing form chiral starting materials, e.g. starting from enantiomerically pure materials. Hence, general formulas (II) and (III) should encompass both the pure stereoisomers, in particular enantiomers, and mixtures of the stereoisomers, in particular mixtures of the enantiomers.

In another preferred embodiment, the compound of the general formula (II) is selected from the group consisting of the following compounds and their stereoisomers, in particular also the enantiomers and mixtures thereof as specified in Table 4:

TABLE 4

Preferred compounds according to general formula (II) or general formula (III) and the present invention.

| Compound No. | Structure |
|---|---|
| A | (structure: methoxymethyl-gem-dimethyl-cyclopentane with acetaldehyde side chain) |
| B | (structure: methoxymethyl-gem-dimethyl-cyclopentane with acetaldehyde side chain, different regiochemistry) |
| D | (structure: methoxymethyl-gem-dimethyl-cyclopentene with hydroxyethyl side chain) |

Generally, the above compounds A, B and D exhibit pleasant and intensive olfactoric properties ranging from fresh and woody notes to herbal, green fragrance impressions of considerable strength.

The above indicated derivates of campholenic aldehyde serve as starting materials for the production of the inventive compounds according to general formula (I) and as shown in the experimental section of the present invention.

Therefore, in a further aspect, the present invention also relates to the use of a compound of general formula (II) or formula (III), as defined above, for preparing the compounds of general formula (I) or their stereoisomers, in particular enantiomers.

The compounds of general formula (I) and formula (II) or (III) according to the invention can either be used as individual substances or in mixtures with at least one other known fragrance substance selected from an extensive range of natural and synthetic substances available in a large number of fragrance mixtures and/or in admixture with one or more ingredients or excipients conventionally used in conjunction with odorants in fragrance compositions, for example carrier materials and other auxiliary agents commonly used in the art.

The olfactory properties of the novel compounds according to general formulas (I), (II) and (III) harmonize with a multitude of natural or synthetic fragrance substances. Hence, they can be advantageously combined as fragrance unit in various compositions, especially in view of their high tenacity and low threshold values in order to create long-lasting and intense novel and original fragrance impressions.

In particular, the compounds according to general formulas (I) and (II) or (III) harmonize particularly well with all floral, herbal and woody notes.

Hence, the present invention further relates to a fragrance composition, comprising at least one compound according to the present invention and thus formula (I) and/or (II) or (III) and at least one further fragrance substance.

Thereby, the fragrance substances specified in the following, can be preferably used, either as individual substances or in mixtures with at least one, two, three or even more fragrance substances, in a large number of various fragrance mixtures and combinations, selected from an extensive range of natural and synthetic substances.

The following list comprises examples of known fragrance substances which are advantageously suitable for combining with the inventive compounds and mixtures thereof:

extracts of natural raw materials such as essential oils, concretes, absolutes, resins, resinoids, balsams, tinctures such as for example: ambergris tincture; amyris oil; angelica seed oil; angelica root oil; anise oil; valerian oil; basil oil; tree moss absolute; bay oil; artemisia oil; benzoin resin; bergamot oil; beeswax absolute; birch tar oil; bitter almond oil; savory oil; buchu leaf oil; cabreuva oil; cade oil; calamus oil; camphor oil; cananga oil; cardamom oil; cascarilla oil; cassia oil; cassie absolute; castoreum absolute cedar leaf oil; cedarwood oil; cistus oil; citronella oil; lemon oil; copaiba balsam; copaiba balsam oil; coriander oil; costus root oil; cumin oil; cypress oil; davana oil; dill weed oil; dill seed oil; eau de brouts absolute; oak moss absolute; elemi oil; tarragon oil; eucalyptus citriodora oil; eucalyptus oil; fennel oil; pine-needle oil; galbanum oil; galbanum resin; geranium oil; grapefruit oil; guaiac wood oil; gurjun balsam; gurjun balsam oil; helichrysum absolute; helichrysum oil; ginger oil; iris root absolute; iris root oil; jasmine absolute; calamus oil; blue camomile oil; Roman camomile oil; carrot seed oil; cascarilla oil; pine-needle oil; spearmint oil; caraway oil; labdanum oil; labdanum absolute; labdanum resin; lavandin absolute; lavandin oil; lavender absolute; lavender oil; lemongrass oil; lovage oil; distilled lime oil; pressed lime oil; linaloe oil; Litsea cubeba oil; bay leaf oil; mace oil; marjoram oil; mandarin oil; massoia bark oil; mimosa absolute; ambrette oil; musk tincture; muscatel sage oil; nutmeg oil; myrrh absolute; myrrh oil; myrtle oil; clove leaf oil; clove bud oil; neroli oil; olibanum absolute; olibanum oil; opopanax oil; orange blossom absolute; orange oil; origanum oil; palmarosa oil; patchouli oil; perilla oil; Peru balsam oil; parsley leaf oil; parsley seed oil; petitgrain oil; peppermint oil; pepper oil; pimento oil; pine oil; pennyroyal oil; rose absolute; rosewood oil; rose oil; rosemary oil; Dalmatian sage oil; Spanish sage oil; sandalwood oil; celery seed oil; spike lavender oil; star anise oil; styrax oil; tagetes oil; fir needle oil; tea tree oil; terpentine oil; thyme oil; Tolu balsam; tonka absolute; tuberose absolute; vanilla extract; violet leaf absolute; verbena oil; vetiver oil; juniper berry oil; cognac oil; wormwood oil; wintergreen oil; ylang ylang oil; hyssop oil; civet absolute; cinnamon leaf oil; cinnamon bark oil, and fractions thereof or constituents isolated therefrom;

individual fragrance substances from the group comprising hydrocarbons, such as for example 3-carene; alpha-pinene; beta-pinene; alpha-terpinene; gamma-terpinene; p-cymene; bisabolene; camphene; caryophyllene; cedrene; farnesene; limonene; longifolene; myrcene; ocimene; valencene; (E,Z)-1,3,5-undecatriene; styrene; diphenylmethane;

aliphatic alcohols such as for example hexanol; octanol; 3-octanol; 2,6-dimethylheptanol; 2-methyl-2-heptanol; 2-methyl-2-octanol; (E)-2-hexenol; (E)- and (Z)-3-hexenol; 1-octen-3-ol; mixtures of 3,4,5,6,6-pentamethyl-3,4-hepten-2-ol and 3,5,6,6-tetramethyl-4-methyleneheptan-2-ol; (E,Z)-2,6-nonadienol; 3,7-dimethyl-7-methoxyoctan-2-ol; 9-decenol; 10-undecenol; 4-methyl-3-decen-5-ol;

aliphatic aldehydes and the acetals thereof such as for example hexanal; heptanal; octanal; nonanal; decanal; undecanal; dodecanal; tridecanal; 2-methyloctanal; 2-methylnonanal; (E)-2-hexenal; (Z)-4-heptenal; 2,6-dimethyl-5-heptenal; 10-undecenal; (E)-4-decenal; 2-dodecenal; 2,6,10-trimethyl-9-undecenal; 2,6,10- trimethyl-5,9-undecadienal; heptanal diethylacetal; 1,1-dimethoxy-2,2,5-trimethyl-4-hexene; citronellyloxyacetaldehyde; 1-(1-methoxypropoxy)-(E/Z)-3-hexene;

aliphatic ketones and the oximes thereof such as for example 2-heptanone; 2-octanone; 3-octanone; 2-nonanone; 5-methyl-3-heptanone; 5-methyl-3-heptanone oxime; 2,4,4,7-tetramethyl-6-octen-3-one; 6-methyl-5-hepten-2-one;

aliphatic sulphur-containing compounds such as for example 3-methylthio-hexanol; 3-methylthiohexyl acetate; 3-mercaptohexanol; 3-mercaptohexyl acetate; 3-mercaptohexyl butyrate; 3-acetylthiohexyl acetate; 1-menthen-8-thiol;

aliphatic nitriles such as for example 2-nonenoic acid nitrile; 2-undecenoic acid nitrile; 2-tridecenoic acid nitrile; 3,12-tridecadienoic acid nitrile; 3,7-dimethyl-2,6-octadienoic acid nitrile; 3,7-dimethyl-6-octenoic acid nitrile;

esters of aliphatic carboxylic acids such as for example (E)- and (Z)-3-hexenyl formate; ethyl acetoacetate; isoamyl acetate; hexyl acetate; 3,5,5-trimethylhexyl acetate; 3-methyl-2-butenyl acetate; (E)-2-hexenyl acetate; (E)- and (Z)-3-hexenyl acetate; octyl acetate; 3-octyl acetate; 1-octen-3-yl acetate; ethyl butyrate; butyl butyrate; isoamyl butyrate; hexyl butyrate; (E)- and (Z)-3-hexenyl-isobutyrate; hexyl crotonate; ethyl isovalerate; ethyl-2-methyl pentanoate; ethyl hexanoate; allyl hexanoate; ethyl heptanoate; allyl heptanoate; ethyl octanoate; ethyl-(E,Z)-2,4-decadienoate; methyl-2-octinate; methyl-2-noninate; allyl-2-isoamyloxyacetate; methyl-3,7-dimethyl-2,6-octadienoate; 4-methyl-2-pentyl-crotonate;

acyclic terpene alcohols such as for example: citronellol; geraniol; nerol; linalool; lavandulol; nerolidol; farnesol; tetrahydrolinalool; tetrahydrogeraniol; 2,6-dimethyl-7-octen-2-ol; 2,6-dimethyloctan-2-ol; 2-methyl-6-methylene-7-octen-2-ol; 2,6-dimethyl-5,7-octadien-2-ol; 2,6-dimethyl-3,5-octadien-2-ol; 3,7-dimethyl-4,6-octadien-3-ol; 3,7-dimethyl-1,5,7-octatrien-3-ol; 2,6-dimethyl-2,5,7-octatrien-1-ol; and the formates, acetates, propionates, isobutyrates, butyrates, isovalerates, pentanoates, hexanoates, crotonates, tiglinates and 3-methyl-2-butenoates thereof;

acyclic terpene aldehydes and ketones such as for example geranial; neral; citronellal; 7-hydroxy-3,7-dimethyloctanal; 7-methoxy-3,7-dimethyloctanal; 2,6,10-trimethyl-9-undecenal; geranyl acetone; and the dimethyl and diethyl acetals of geranial, neral, 7-hydroxy-3,7-dimethyloctanal;

cyclic terpene alcohols such as for example: menthol; isopulegol; alpha-terpineol; terpinenol-4; menthan-8-ol; menthan-1-ol; menthan-7-ol; borneol; isoborneol; linalool oxide; nopol; cedrol; ambrinol; vetiverol; guaiol; and the formates, acetates, propionates, isobutyrates, butyrates, isovalerates, pentanoates, hexanoates, crotonates, tiglinates and 3-methyl-2-butenoates thereof;

cyclic terpene aldehydes and ketones such as for example menthone; isomenthone; 8-mercaptomenthan-3-one; carvone; camphor; fenchone; alpha-ionone; beta-ionone; alpha-n-methyl ionone; beta-n-methyl ionone; alpha-isomethyl ionone; beta-isomethyl ionone; alpha-irone; alpha-damascone; beta-damascone; beta-damascenone; delta-damascone; gamma-damascone; 1-(2,4-trimethyl-2-cyclohexen-1-yl)-2-buten-1-one; 1,3,4,6,7,8a-hexahydro-1,1,5,5-tetramethyl-2H-2,4a-methanonaphthalen-8(5H)-one; 2-methyl-4-(2,6,6-trimethyl-1-cyclohexen-1-yl)-2-butenal; nootkatone; dihydronootkatone; 4,6,8-megastigmatrien-3-one; alpha-sinensal; beta-sinensal; acetylated cedarwood oil (methylcedryl ketone);

cyclic alcohols such as for example: 4-tert-butylcyclohexanol; 3,3,5-trimethylcyclohexanol; 3-isocamphylcyclohexanol; 2,6,9-trimethyl-Z2,Z5,E9-cyclododecatrien-1-ol; 2-isobutyl-4-methyltetrahydro-2H-pyran-4-ol;

cycloaliphatic alcohols such as for example alpha-3,3-trimethylcyclohexylmethanol; 1-(4-isopropylcyclohexyl)ethanol; 2-methyl-4-(2,2,3-trimethyl-3-cyclopent-1-yl)butanol; 2-methyl-4-(2,2,3-trimethyl-3-cyclopent-1-yl)-2-buten-1-ol; 2-ethyl-4-(2,2,3-trimethyl-3-cyclopent-1-yl)-2-buten-1-ol; 3-methyl-5-(2,2,3-trimethyl-3-cyclopent-1-yl)-pentan-2-ol; 3-methyl-5-(2,2,3-trimethyl-3-cyclopent-1-yl)-4-penten-2-ol; 3,3-dimethyl-5-(2,2,3-trimethyl-3-cyclopent-1-yl)-4-penten-2-ol; 1-(2,2,6-trimethylcyclohexyl)pentan-3-ol; 1-(2,2,6-trimethylcyclohexyl)hexan-3-ol;

cyclic and cycloaliphatic ethers such as for example: cineole; cedryl methyl ether; cyclododecyl methyl ether; 1,1-dimethoxycyclododecane; (ethoxymethoxy)cyclododecane; alpha-cedrene epoxide; 3a,6,6,9a-tetramethyldodecahydronaphtho[2,1-b]furan; 3a-ethyl-6,6,9a-trimethyldodeca-hydronaphtho[2,1-b]furan; 1,5,9-trimethyl-13-oxabicyclo[10.1.0]trideca-4,8-diene; rose oxide; 2-(2,4-dimethyl-3-cyclohexen-1-yl)-5-methyl-5-(1-methylpropyl)-1,3-dioxane;

cyclic and macrocyclic ketones such as for example 4-tert-butylcyclohexanone; 2,2,5-trimethyl-5-pentylcyclopentanone; 2-heptylcyclopentanone; 2-pentylcyclopentanone; 2-hydroxy-3-methyl-2-cyclopenten-1-one; 3-methyl-cis-2-penten-1-yl-2-cyclopenten-1-one; 3-methyl-2-pentyl-2-cyclopenten-1-one; 3-methyl-4-cyclopentadecenone; 3-methyl-5-cyclopentadecenone; 3-methylcyclopentadecanone; 4-(1-ethoxyvinyl)-3,3,5,5-tetramethylcyclohexanone; 4-tert-pentylcyclohexanone; 5-cyclohexadecen-1-one; 6,7-dihydro-1,1,2,3,3-pentamethyl-4(5H)-indanone; 8-cyclohexadecen-1-one; 9-cycloheptadecen-1-one; cyclopentadecanone; cyclohexadecanone;

cycloaliphatic aldehydes such as for example 2,4-dimethyl-3-cyclohexene carbaldehyde; 2-methyl-4-(2,2,6-trimethyl-cyclohexen-1-yl)-2-butenal; 4-(4-hydroxy-4-methylpentyl)-3-cyclohexene carbaldehyde; 4-(4-methyl-3-penten-1-yl)-3-cyclohexene carbaldehyde;

cycloaliphatic ketones such as for example 1-(3,3-dimethyl-cyclohexyl)-4-penten-1-one; 2,2-dimethyl-1-(2,4-dimethyl-3-cyclohexene-1-yl)-1-propanone; 1-(5,5-dimethyl-1-cyclohexen-1-yl)-4-penten-1-one; 2,3,8,8-tetramethyl-1,2,3,4,5,6,7,8-octahydro-2-naphthalenyl methyl ketone; methyl-2,6,10-trimethyl-2,5,9-cyclodecatrienyl ketone; tert-butyl-(2,4-dimethyl-3-cyclohexen-1-yl) ketone;

esters of cyclic alcohols such as for example 2-tert-butylcyclohexyl acetate; 4-tert-butylcyclohexyl acetate; 2-tert-pentylcyclohexyl acetate; 4-tert-pentylcyclohexyl acetate; 3,3,5-trimethylcyclohexyl acetate; decahydro-2-naphthyl acetate; 2-cyclopentylcyclopentyl crotonate; 3-pentyltetrahydro-2H-pyran-4-yl acetate; decahydro-2,5,5,8a-tetramethyl-2-naphthyl acetate; 4,7-methano-3a,4,5,6,7,7a-hexahydro-5- or 6-indenyl acetate; 4,7-methano-3a,4,5,6,7,7a-hexahydro-5- or 6-indenyl propionate; 4,7-methano-3a,4,5, 6,7,7a-hexahydro-5- or 6-indenyl isobutyrate; 4,7-methanooctahydro-5- or 6-indenyl acetate;

esters of cycloaliphatic alcohols such as for example 1-cyclohexylethyl crotonate; esters of cycloaliphatic carboxylic acids such as for example allyl-3-cyclohexyl propionate; allylcyclohexyl oxyacetate; cis- and trans-methyl dihydrojasmonate; cis- and trans-methyl jasmonate; methyl-2-hexyl-3-oxocyclopentane carboxylate; ethyl-2-ethyl-6,6-dimethyl-2-cyclohexene carboxylate; ethyl-2,3,6,6-tetramethyl-2-cyclohexene carboxylate; ethyl-2-methyl-1,3-dioxolane 2-acetate;

araliphatic alcohols such as for example benzyl alcohol; 1-phenylethyl alcohol; 2-phenylethyl alcohol; 3-phenylpropanol; 2-phenylpropanol; 2-phenoxyethanol; 2,2-dimethyl-3-phenylpropanol; 2,2-dimethyl-3-(3-methylphenyl)propanol; 1,1-dimethyl-2-phenylethyl alcohol; 1,1-dimethyl-3-phenylpropanol; 1-ethyl-1-methyl-3-phenylpropanol; 2-methyl-5-phenylpentanol; 3-methyl-5-phenylpentanol; 3-phenyl-2-propen-1-ol; 4-methoxybenzyl alcohol; 1-(4-isopropylphenyl)ethanol;

esters of araliphatic alcohols and aliphatic carboxylic acids such as for example benzyl acetate; benzyl propionate; benzyl isobutyrate; benzyl isovalerate; 2-phenylethyl acetate; 2-phenylethyl propionate; 2-phenylethyl isobutyrate; 2-phenylethyl isovalerate; 1-phenylethyl acetate; alpha-trichloromethylbenzyl acetate; alpha,alpha-dimethylphenylethyl acetate; alpha,alpha-dimethylphenyl-ethyl butyrate; cinnamyl acetate; 2-phenoxyethyl isobutyrate; 4-methoxybenzyl acetate; araliphatic ethers such as for example: 2-phenyl ethyl methyl ether; 2-phenyl ethyl isoamyl ether; 2-phenyl ethyl 1-ethoxyethyl ether; phenylacetaldehyde dimethylacetal; phenylacetaldehyde diethylacetal; hydratropaldehyde dimethylacetal; phenylacetaldehyde glycerol acetal; 2,4,6-trimethyl-4-phenyl-1,3-dioxane; 4,4a,5,9b-tetrahydroindeno[1,2-d]-m-dioxin; 4,4a,5,9b-tetrahydro-2,4-dimethylindeno[1,2-d]-m-dioxin;

aromatic and araliphatic aldehydes such as for example: benzaldehyde; phenylacetaldehyde; 3-phenylpropanal; hydratropaldehyde; 4-methylbenz-aldehyde; 4-methylphenylacetaldehyde; 3-(4-ethylphenyl)-2,2-dimethylpropanal; 2-methyl-3-(4-isopropylphenyl)propanal; 2-methyl-3-(4-tert-butylphenyl)propanal; 2-methyl-3-(4-isobutylphenyl)propanal; 3-(4-tert-butylphenyl)propanal; cinnamaldehyde; alpha-butylcinnamaldehyde; alpha-amylcinnamaldehyde; alpha-hexylcinnamaldehyde; 3-methyl-5-phenylpentanal; 4-methoxybenzaldehyde; 4-hydroxy-3-methoxybenzaldehyde; 4-hydroxy-3-ethoxybenzaldehyde; 3,4-methylenedioxybenzaldehyde; 3,4-dimethoxybenzaldehyde; 2-methyl-3-(4-methoxyphenyl)propanal; 2-methyl-3-(4-methylenedioxyphenyl)propanal;

aromatic and araliphatic ketones such as for example: acetophenone; 4-methyl-acetophenone; 4-methoxyacetophenone; 4-tert-butyl-2,6-dimethylacetophenone; 4-phenyl-2-butanone; 4-(4-hydroxyphenyl)-2-butanone; 1-(2-naphthalenyl)ethanone; 2-benzofuranylethanone; (3-methyl-2-benzofuranyl)ethanone; benzophenone; 1,1,2,3,3,6-hexamethyl-5-indanyl methyl ketone; 6-tert-butyl-1,1-dimethyl-4-indanyl methyl ketone; 1-[2,3-dihydro-1,1,2,6-tetramethyl-3-(1-methylethyl)-1H-5-indenyl]ethanone; 5',6',7',8'-tetrahydro-3',5',5',6',8',8'-hexamethyl-2-acetonaphthone;

aromatic and araliphatic carboxylic acids and the esters thereof such as for example: benzoic acid; phenylacetic acid; methyl benzoate; ethyl benzoate; hexyl benzoate; benzyl benzoate; methylphenyl acetate; ethylphenyl acetate; geranylphenyl acetate; phenylethylphenyl acetate; methyl cinnamate; ethyl cinnamate; benzyl cinnamate; phenylethyl cinnamate; cinnamyl cinnamate; allyl phenoxy acetate; methyl salicylate; isoamyl salicylate; hexyl salicylate; cyclohexyl salicylate; cis-3-hexenyl salicylate; benzyl salicylate; phenylethyl salicylate; methyl-2,4-dihydroxy-3,6-dimethylbenzoate; ethyl-3-phenyl glycidate; ethyl-3-methyl-3-phenyl glycidate;

nitrogenous aromatic compounds such as for example: 2,4,6-trinitro-1,3-dimethyl-5-tert-butylbenzene; 3,5-dinitro-2,6-dimethyl-4-tert-butyl aceto-phenone; cinnamonitrile; 3-methyl-5-phenyl-2-pentenoic acid nitrile; 3-methyl-5-phenylpentanoic acid nitrile; methyl anthranilate; methyl-N-methyl anthranilate; Schiff bases of methyl anthranilate with 7-hydroxy-3,7-dimethyloctanal, 2-methyl-3-(4-tert-butylphenyl)propanal or 2,4-dimethyl-3-cyclohexene carbaldehyde 6-isopropyl quinoline; 6-isobutyl quinoline; 6-sec-butyl quinoline; 2-(3-phenylpropyl)pyridine; indole; skatole; 2-methoxy-3-isopropylpyrazine; 2-isobutyl-3-methoxypyrazine;

phenols, phenyl ethers and phenyl esters such as for example: estragole; anethole; eugenol; eugenyl methyl ether; isoeugenol; isoeugenyl methyl ether; thymol; carvacrol; diphenyl ether; beta-naphthyl methyl ether; beta-naphthyl ethyl ether; beta-naphthyl isobutyl ether; 1,4-dimethoxybenzene; eugenyl acetate; 2-methoxy-4-methylphenol; 2-ethoxy-5-(1-propenyl)phenol; p-cresyl phenyl acetate; heterocyclic compounds such as for example: 2,5-dimethyl-4-hydroxy-2H-furan-3-one; 2-ethyl-4-hydroxy-5-methyl-2H-furan-3-one; 3-hydroxy-2-methyl-4H-pyran-4-one; 2-ethyl-3-hydroxy-4H-pyran-4-one;

lactones such as for example: 1,4-octanolide; 3-methyl-1,4-octanolide; 1,4-nonanolide; 1,4-decanolide; 8-decen-1,4-olide; 1,4-undecanolide; 1,4-dodecan-olide; 1,5-decanolide; 1,5-dodecanolide; 4-methyl-1,4-decanolide; 1,15-penta-decanolide; cis- and trans-11-pentadecen-1,15-olide; cis- and trans-12-pentadecen-1,15-olide; 1,16-hexadecanolide; 9-hexadecen-1,16-olide; 10-oxa-1,16-hexadecanolide; 11-oxa-1,16-hexadecanolide; 12-oxa-1,16-hexadecanolide; ethylene 1,12-dodecanedioate; ethylene 1,13-tridecanedioate; coumarin; 2,3-dihydrocoumarin; octahydrocoumarin; and mixtures of the above substances.

It goes without saying that it is preferred, albeit not absolutely essential, for a fragrance substance composition according to the invention to comprise an amount of a compound according to the invention, preferably selected from compounds of general formula (I), which is olfactorily perceptible as a sandalwood odor note. However, based on the high olfactory intensity of the inventive compounds (primary property) in combination with the high tenacity (secondary property), generally, only low amounts of the inventive compounds are required to achieve the desired odor impression accompanied by enhanced environmental sustainability.

In fragrance compositions, the amount of the compound according to the invention used is preferably around 0.0001 to 90% by weight, preferably 0.01 to 70% by weight and particularly preferably 0.1 to 50% by weight, relative to the total amount of the fragrance composition.

Fragrance compositions which contain the at least one compound according to the invention may be used for perfuming applications in liquid form, undiluted or diluted with a solvent. Solvents suitable for this purpose are for example ethanol, isopropanol, diethylene glycol monoethyl ether, glycerol, propylene glycol, 1,2-butylene glycol, dipropylene glycol, diethyl phthalate, triethyl citrate, isopropyl myristate, triacetin, vegetable oils, etc.

Moreover, fragrance compositions which contain one or more compounds according to the invention may be adsorbed on a carrier which ensures both a fine distribution of the fragrance substances in the product and controlled release upon use. Such carriers may be porous inorganic materials such as sodium sulphate, silica gels, zeolites, gypsums, clays, clay granules, aerated concrete etc., or organic materials such as woods, cellulose-based substances, sugars, dextrins (for example maltodextrin), or plastics such as PVC, polyvinyl acetates or polyurethanes.

Fragrance compositions which contain at least one compound according to the invention indicated by formulas (I) and (II) or (III) may also be microencapsulated, spray-dried, be provided as inclusion complexes or as extrusion products (i.e. products according to the invention).

Optionally, the properties of the fragrance compositions modified in such a way may be further optimized with regard to a more targeted fragrance release by "coating" with suitable materials, for which purpose waxy plastics such as for example polyvinyl alcohol are preferably used. The resultant products are in turn products according to the invention.

The fragrance compositions according to the invention may be encapsulated, for example, by coacervation methods with the assistance of capsule materials made for example from polyurethane-type substances or soft gelatine.

Spray-dried fragrance compositions may be produced for example by spray-drying an emulsion or dispersion containing the fragrance substance composition, wherein modified starches, proteins, dextrin and vegetable gums may be used as carriers. Inclusion complexes may be produced for example by introducing dispersions of the fragrance substance composition and cyclodextrins or urea derivatives into a suitable solvent, for example water.

Extrusion products may be produced by melting the fragrance substance compositions with a suitable waxy substance and extruding with subsequent solidification, optionally in a suitable solvent, for example isopropanol.

Based on the enhanced olfactory properties, such as high odor intensity (impact), low odor threshold values and high tenacity (fixation) in view of commercially available synthetic sandalwood substitutes, the compounds according to formulas (I), (II) and (III), in particular formula (I), as well as compositions comprising one or more of these inventive compounds are suitable to achieve a pleasant odor impression, in particular a natural-like sandalwood fragrance impression with hight strength even if only used in small amounts. Furthermore, based in the present application it is possible to provide environmentally sustainable fragrance compounds which are able to satisfy the present as well as future need for fragrance compounds exhibiting (and even exceeding) the beneficial olfactory properties of natural, long lasting and radiant sandalwood oil.

The compounds according to formula (I) and the invention accordingly have an organoleptically highly valuable intense and natural sandalwood note combined with a surprisingly elevated tenacity. In corresponding fragrance compositions, comprising at least one of the inventive compounds, the compounds exhibit a positive action over the entire fragrance chord by distinctly enhancing the natural-like sandal note of the composition and simultaneously providing excellent tenacity. The compound according to the invention and especially according to formula (I) may therefore in particular be used as a fixative in fragrance compositions and perfumed products.

In another aspect, the present invention thus relates to the use of a compound according to general formula (I), (II) or (III) or a fragrance composition comprising at least one of these compounds as an odorant or for improving the fixation of a fragrance compound or for the preparation of a perfumed product. The comments made above apply correspondingly to preferred compounds and mixtures.

The compounds indicted above, exhibiting specific odor profiles as well as the mixtures thereof, and also the fragrance compositions according to the invention, as defined above, are particularly suitable for the preparation of perfumed products. Based on these compounds, mixtures and compositions it is possible to obtain perfumed products, in particular products emanating a woody, sandalwood-like odor impression. Due to the long tenacity in combination with the low threshold values only small amounts of the inventive compounds, in particular the compounds derived from general formula (I), are required to achieve an intense, radiant, attractive, natural woody sandalwood-like smell emanating from the perfumed products.

Moreover, these fragrance compounds and fragrance compositions can be used in order to convey a natural-like sandalwood odor in the resultant complete mixture, to enhance an existing sandalwood odor in the composition of the other constituents, and/or to modify an existing sandalwood odor in the composition of the other constituents.

In particular, it was found, that the compounds of formula (I) in general and in particular, compounds 1 to 4 are particularly excellent for imparting, modifying and/or enhancing a woody sandalwood-like fragrance being confusingly similar to the odor profile of natural sandalwood essential oil. The fact that the compounds have such an expressive scent and long tenacity is surprising. Furthermore, the combination of high intensity and tenacity allows for the use of said compounds and composition to achieve a pleasant odor in conjunction with an improved fixation of a fragrance compound resulting in an harmonic and long-lasting overall odor impression with the reminiscence of natural sandalwood, applicable for various perfumed products and for the production thereof.

The inventive compounds or fragrance compositions can be incorporated into products which are perfumed or are intended to be perfumed, in particular formulations serving for personal hygiene such as cleaning agents, laundry agents in order to achieve an intense and long-lasting sandalwood-like note, even if used in small amounts.

The perfumed products according to the invention containing the inventive compounds or fragrance compositions can be obtained by incorporating the compound or composition according to the invention as solid substance without a solvent, as a solution or in the form of a mixture with a solid or liquid carrier and optionally other auxiliaries and/or stabilizers.

The present invention, therefore, further refers to perfumed products comprising a compound according formula (I), (II) and/or (III) or a fragrance composition comprising at least one of said compounds in an effective amount, and a carrier or substrate. In this context, the inventive compounds are either used individually or as part of a mixture or fragrance composition according to the invention.

A sensory effective amount means that already a proportion of the substances of formula (I), formula (II) and/or formula (III), in particular compounds according to general formula (I), in the mixture is sufficient to emanate a pleasant perceptible fragrance impression, especially a sandalwood-like woody odor impression. This perceivable olfactory impression is generally achieved when at least 0.001 wt. % of the compounds of formula (I), formula (II) or formula (III) are present.

Perfumed products according to the invention are for example perfume extracts, eau de parfum, eau de toilette, shaving lotions, eau de colognes, pre-shave products, splash colognes and perfumed tissue wipes, including for perfuming acidic, alkaline and neutral cleaning agents such as for example floor cleaners, window cleaners, dishwashing detergents, bath and sanitary cleaners, scouring creams, solid and liquid toilet cleaners, pulverulent and foam carpet cleaners, textile fresheners, ironing aids, liquid detergents, pulverulent detergents, laundry pre-treatment agents such as bleaches, soaking agents and stain removers, laundry rinse conditioners, laundry soaps, laundry tablets, disinfectants, surface disinfectants as well as air fresheners in liquid or gel form or those applied to a solid carrier, aerosol sprays, waxes and polishes such as furniture polishes, floor waxes and shoe polishes as well as body care products such as for example solid and liquid soaps, shower gels, shampoos, shaving soaps, shaving foams, bath oils, cosmetic emulsions of the oil-in-water, water-in-oil and water-in-oil-in-water type such as for example skin creams and lotions, face creams and lotions, sunscreen creams and lotions, after-sun creams and lotions, hand creams and lotions, foot creams and lotions, depilatory creams and lotions, after-shave creams and lotions, tanning creams and lotions, hair care products such as for example hair sprays, hair gels, strengthening hair lotions, hair rinses, permanent and semi-permanent hair dyes, hair styling agents such as cold waving and hair straightening agents, hair tonics, hair creams and lotions, deodorants and antiperspirants such as for example under-arm sprays, roll-ons, deodorant sticks, deodorant creams, decorative cosmetic products such as for example eyeshadow, nail varnish, make-up products, lipstick, mascara, as well as candles, lamp oils, incense sticks, insecticides, repellents and fuels for oral and/or dental care products such as toothpastes, tooth gels, tooth powders, mouthwashes, chewing gums and other oral care products.

The products according to the invention may also be semi-finished products comprising a compound of general formula (I), (II) and/or (III) or a fragrance composition containing at least a compound according to the invention in an effective amount.

The percentages at which the compound of general formula (I), (II) and/or (III) or a fragrance composition which contains at least a compound according to the invention is used may vary within wide limits, ranging from a few parts per thousand as even small amounts of the novel compounds or fragrance compositions comprising such compounds provide a rich sandalwood, woody and/or creamy impression. Preferably, the compound of general formula (I), (II) and/or (III) or the fragrance composition which contains at least a compound according to the invention is used in an amount of 0.0001 to 90% by weight, preferably 0.01 to 70% by weight and particularly preferably 0.1 to 50% by weight, based on the total weight of the final formulation.

Finally, in yet another embodiment, the perfumed product is preferably a perfume oil, perfume base, formulation for personal hygiene, cleaning agent or laundry agent.

EXAMPLES

Preparation of Compounds A to D or their Enantiomers and Experimental Data Thereof Compound A: 2-[1-(Methoxymethyl)-2,2-dimethyl-3-bicyclo[3.1.0]hexan-yl]acetaldehyde Compound A was prepared according to the method described in *Helvetica Chimica Acta,* 1998 (81), 1349-1358.

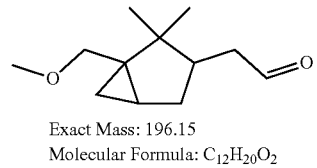

Exact Mass: 196.15
Molecular Formula: $C_{12}H_{20}O_2$

Experimental Data of 2-[1-(methoxymethyl)-2,2-dimethyl-3-bicyclo[3.1.0]hexanyl]acetaldehyde NMR-Data:
$^1$H NMR (400 MHz, $C_6D_6$) δ9.30 (dd, J=2.5, 1.8 Hz, 1H), 3.59 (dd, J=10.4, 1.5 Hz, 1H), 3.06 (s, 3H), 2.73 (d, J=10.3 Hz, 1H), 1.86 (ddd, J=15.8, 4.0, 1.8 Hz, 1H), 1.75 (dd, J=12.2, 6.8 Hz, 1H), 1.65 (ddd, J=15.9, 10.4, 2.5 Hz, 1H), 1.47 (tdd, J=10.7, 6.8, 3.9 Hz, 1H), 1.21-1.13 (m, 1H), 0.97 (s, 3H), 0.91 (dt, J=8.1, 4.0 Hz, 1H), 0.72 (s, 3H), 0.52 (ddd, J=5.5, 3.8, 1.4 Hz, 1H), 0.38-0.33 (m, 1H).
$^{13}$C NMR (101 MHz, $C_6D_6$) δ200.57, 75.82, 58.19, 44.45, 41.45, 39.46, 34.87, 32.11, 24.62, 20.03, 19.93, 12.78.
GC-MS-Data: 196, 181, 149, 137, 120, 99, 79, 67, 45, 29.
Odor description: camphor, pine, raspberry, spicy, heliotropin.

Compound B: 2-[3-(Methoxymethyl)-2,2-dimethyl-cyclopentyl]acetaldehyde

Compound B was prepare by hydrogenating 2-[3-(methoxymethyl)-2,2-dimethyl-cyclopent-3-en-1-yl]acetaldehyde (30 g, 164.6 mmol) using 0.2 g of Pd/C (5%) under a pressure of 25 bar at 80° C., resulting in a yield of 28.7 g for the raw material. Subsequent purification by bulb-to-bulb distillation at 104° C. and 1.4 mbar resulted in the pure compound B with a yield of 26.8 g (88%).

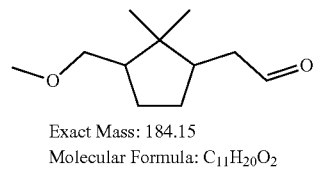

Exact Mass: 184.15
Molecular Formula: $C_{11}H_{20}O_2$

Experimental Data of 2-[3-(methoxymethyl)-2,2-dimethyl-cyclopentyl]acetaldehyde

NMR-Data:
$^1$H NMR (600 MHz, $CDCl_3$) δ9.78 (t, J=2.9, 1.5 Hz, 1H), 3.44 (dd, J=9.2, 5.5 Hz, 1H), 3.33 (s, 3H), 3.24 (dd, J=9.2, 7.4 Hz, 1H), 2.48 (ddd, J=15.9, 3.4, 1.8 Hz, 1H), 2.19 (ddd, J=15.9, 10.3, 2.7 Hz, 1H), 2.00-1.82 (m, 4H), 1.38-1.30 (m, 1H), 1.30-1.22 (m, 1H), 1.02 (s, 3H), 0.61 (s, 3H).

$^{13}$C NMR (151 MHz, CDCl$_3$) δ202.90, 74.65, 58.87, 49.20, 45.13, 44.70, 42.12, 28.31, 26.40, 26.39, 15.44.

Odor description: herbal, sorrel, green.

Compound C: 2-[3-(Methoxymethyl)-2,2-dimethyl-cyclopent-3-en-1-yl]-acetaldehyde

Compound C was prepared according to the method described in *Helvetica Chimica Acta,* 1992 (75) 1527.

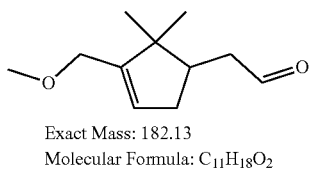

Exact Mass: 182.13
Molecular Formula: C$_{11}$H$_{18}$O$_2$

Experimental Data of 2-[3-(methoxymethyl)-2,2-dimethyl-cyclopent-3-en-1-yl]-acetaldehyde NMR-Data:
$^1$H NMR (400 MHz, CDCl$_3$): δ9.81 (t, J=2.1 Hz, 1H), 5.59 (dq, J=3.1, 1.5 Hz, 1H), 3.93 (dq, J=2.6, 1.4 Hz, 2H), 3.33 (s, 3H), 2.54 (ddd, J=15.1, 3.8, 1.9 Hz, 1H), 2.52-2.46 (m, 1H), 2.44-2.35 (m, 1H), 2.38-2.29 (m, 1H), 1.98 (ddq, J=15.8, 8.8, 2.1 Hz, 1H), 1.07 (s, 3H), 0.89 (s, 3H).

$^{13}$C NMR (101 MHz, CDCl$_3$): δ202.71, 148.24, 125.31, 69.35, 58.11, 46.48, 44.70, 44.66, 35.66, 25.72, 20.86.

GC-MS-Data: 182, 167, 150, 138, 123, 106, 91, 79, 67, 53, 45.

Odor description: aldehydic, milky, almondy, pistachio, edible.

Compound D: 2-[3-(Methoxymethyl)-2,2-dimethyl-cyclopent-3-en-1-yl]-ethanol

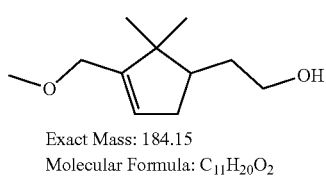

Exact Mass: 184.15
Molecular Formula: C$_{11}$H$_{20}$O$_2$

Experimental Data of 2-[3-(methoxymethyl)-2,2-dimethyl-cyclopent-3-en-1-yl]-ethanol NMR-Data:
$^1$H NMR (600 MHz, C$_6$D$_6$) δ5.59 (p, J=2.9, 1.5 Hz, 1H), 3.86-3.80 (m, 2H), 3.41 (ddd, J=10.3, 7.8, 5.2 Hz, 1H), 3.33 (dt, J=10.3, 7.3 Hz, 1H), 3.13 (s, 3H), 2.25-2.20 (m, 1H), 1.86-1.81 (m, 1H), 1.82-1.76 (m, 1H), 1.52 (dtd, J=12.8, 7.3, 3.4 Hz, 1H), 1.28 (dddd, J=13.1, 11.0, 7.2, 5.2 Hz, 1H), 1.03 (s, 3H), 0.84 (s, 3H).

$^{13}$C NMR (151 MHz, C$_6$D$_6$) δ149.30, 125.47, 69.74, 62.16, 57.75, 47.82, 46.51, 35.83, 33.05, 25.86, 20.80.

Odor description: fresh, woody, fruity, citrus.

Preparation of Compounds 1 to 8 or their Enantiomers and Experimental Data Thereof Compound 1: 4-[3-(Methoxymethyl)-2,2-dimethyl-cyclopent-3-en-1-yl]-2-methyl-but-2-en-1-ol Step 1: Preparation of 4-[3-(methoxymethyl)-2,2-dimethyl-cyclopent-3-en-1-yl]-2-methyl-but-2-enal (Intermediate Compound)

Firstly, a sodium methoxide solution (0.78 g NaOH in 75 mL) was slowly added to 2-[3-(methoxymethyl)-2,2-dimethyl-cyclopent-3-en-1-yl]acetaldehyde (25.0 g, 137.3 mmol) at room temperature (exothermic reaction: T<27° C.), followed by slow addition of propanal (18 mL, 260 mmol). The reaction was kept at room temperature, until the reaction was completed. Thereafter, the reaction mixture was quenched using ice water, and the resulting product extracted using MTBE (30 mL×3). Subsequently, the combined organic phases were washed with water until a neutral pH was reached, dried with Na$_2$SO$_4$, filtered and the solvent distilled under vacuum to obtain the intermediate compound as raw material (31.0 g). The as-obtained product was immediately stabilized with tocopherol and used in the following step without further purification.

Step 2: Preparation of 4-[3-(methoxymethyl)-2,2-dimethyl-cyclopent-3-en-1-yl]-2-methyl-but-2-en-1-ol (Compound 1)

To a suspension of LAH (3.6 mg, 94.9 mmol) in anhydrous THF (100 ml) a solution of the as-obtained 4-[3-(methoxymethyl)-2,2-dimethyl-cyclopent-3-en-1-yl]-2-methyl-but-2-enal (31.0 g) in anhydrous THF (50 mL) was slowly added at a temperature of about 0 to 5° C. Thereafter, the reaction was kept at room temperature, until the reaction was completed. Subsequently, the reaction mixture was quenched with ice water, the as-obtained salt was reacted using 25% H$_2$SO$_4$ (25 mL), and the resulting product extracted using MTBE (50 mL x3). Then the organic phase was washed with saturated NaHCO$_3$ solution (50 mL). Finally, the combined organic phases were washed with water until a neutral pH was reached, dried with Na$_2$SO$_4$, filtered and the solvent distilled under vacuum to obtain the raw product (31.0 g), which was purified using a 15 cm-Vigreux column (R$_T$=104° C., V$_T$=85 to 156° C., vacuum=0.41 mbar) to obtain 14.2 g of the product 4-[3-(methoxymethyl)-2,2-dimethyl-cyclopent-3-en-1-yl]-2-methyl-but-2-en-1-ol (compound 1; overall yield=46%), along with a minor amount of the isomerized side product 4-[3-(methoxymethyl)-2,2-dimethyl-cyclopent-3-en-1-yl]-2-methyl-but-3-en-1-ol.

Experimental Data of 4-[3-(methoxymethyl)-2,2-dimethyl-cyclopent-3-en-1-yl]-2-methyl-but-2-en-1-ol (Compound 1)

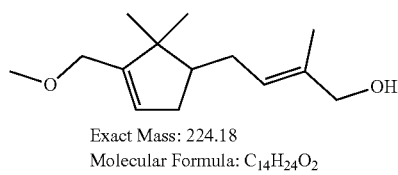

Exact Mass: 224.18
Molecular Formula: C$_{14}$H$_{24}$O$_2$

NMR-Data:

¹H NMR (400 MHz, CDCl₃) δ5.57 (dp, J=3.2, 1.8 Hz, 1H), 5.44 (tp, J=7.0, 1.4 Hz, 1H), 4.01 (d, J=4.7 Hz, 2H), 3.94-3.91 (m, 2H), 3.33 (s, 3H), 2.36 (dddd, J=13.8, 6.8, 3.1, 1.5 Hz, 1H), 2.17 (ddd, J=13.9, 7.1, 4.5 Hz, 1H), 2.06-1.96 (m, 1H), 1.96-1.80 (m, 2H), 1.69 (d, J=1.3 Hz, 3H), 1.53-1.40 (m, 1H), 1.06 (s, 3H), 0.89 (s, 3H).

¹³C NMR (101 MHz, CDCl₃) δ148.70, 134.91, 125.73, 125.42, 69.50, 69.07, 58.07, 50.92, 46.35, 35.69, 27.75, 26.01, 20.58, 13.80.

GC-MS-Data: 224, 209, 192, 177, 159, 137, 123, 107, 93, 79, 67, 55, 43.

Odor description: sandal, woody.

Experimental Data of 4-[3-(methoxymethyl)-2,2-dimethyl-cyclopent-3-en-1-yl]-2-methyl-but-3-en-1-ol (Side Product, Compound 1a)

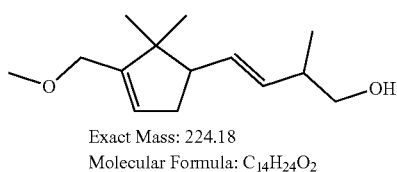 [SMILES: COCC1=CCC(/C=C/C(C)CO)C1(C)C]

Exact Mass: 224.18
Molecular Formula: C₁₄H₂₄O₂

NMR-Data:

¹H NMR (600 MHz, Benzene-d₆) δ5.60 (dq, J=3.1, 1.6 Hz, 1H), 5.52 (ddd, J=15.4, 8.7, 1.1 Hz, 1H), 5.25 (ddd, J=15.4, 7.7, 1.0 Hz, 1H), 3.84-3.79 (m, 2H), 3.28 (dd, J=10.3, 6.2 Hz, 1H), 3.25 (dd, J=10.3, 7.0 Hz, 1H), 3.13 (s, 3H), 2.42 (tdd, J=9.2, 8.7, 7.9, 0.9 Hz, 1H), 2.29 (dddt, J=15.9, 7.8, 2.9, 1.4 Hz, 1H), 2.23-2.18 (m, 1H), 2.15 (ddq, J=15.9, 9.3, 2.2 Hz, 1H), 1.06 (s, 3H), 0.91 (d, J=6.8 Hz, 3H), 0.91 (s, 3H).

¹³C NMR (151 MHz, Benzene-d₆) δ148.8, 134.2, 131.7, 125.1, 69.8, 67.6, 57.8, 55.3, 47.7, 40.2, 35.9, 25.7, 21.6, 16.8.

Compound 2: 4-[3-(Methoxymethyl)-2,2-dimethyl-cyclopent-3-en-1-yl]-2-methyl-butan-1-ol A mixture of 4-[3-(methoxymethyl)-2,2-dimethyl-cyclopent-3-en-1-yl]-2-methyl-but-2-en-1-ol (compound 1; 10.0 g, 44.6 mmol), propan-2-ol (100 mL) and Ra—Ni B113W (0.5 g) was hydrogenated at room temperature under atmospheric pressure. After the completion of the reaction (ca. 8 h), the catalyst was removed by filtration and the resulting filtrate evaporated under vacuum to obtain the raw product, which was further purified by bulb-to-bulb distillation (T=140° C., p=0.3 mbar) resulting in 8.6 g (85%) of 4-[3-(methoxymethyl)-2,2-dimethyl-cyclopent-3-en-1-yl]-2-methyl-butan-1-ol (compound 2), along with the hydrogenated compound 4-[3-(methoxymethyl)-2,2-dimethyl-cyclopentyl]-2-methyl-butan-1-ol in a ratio of 3:1.

Experimental Data of 4-[3-(methoxymethyl)-2,2-dimethyl-cyclopent-3-en-1-yl]-2-methyl-butan-1-ol (Compound 2)

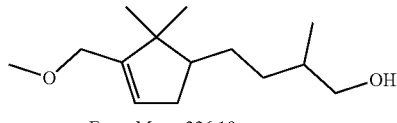

Exact Mass: 226.19
Molecular Formula: C₁₄H₂₆O₂

NMR-Data:

¹H NMR (600 MHz, C₆D₆) δ5.58 (dd, J=3.1, 1.7 Hz, 2H), 3.92 (dt, J=2.6, 1.3 Hz, 4H), 3.57-3.48 (m, 1H), 3.47-3.41 (m, 1H), 3.33 (s, 3H), 2.41-2.34 (m, 1H), 1.81-1.71 (m, 1H), 1.69-1.57 (m, 1H), 1.54-1.05 (m, 3H), 1.03 (s, 3H), 0.95 (d, J=6.8 Hz, 3H), 0.85 (s, 3H).

¹³C NMR (151 MHz, C₆D₆) δ148.94, 125.44, 69.54, 68.22, 58.09, 51.36, 46.38, 36.28, 35.89, 32.33, 26.91, 25.90, 20.60, 16.85.

GC-MS-Data: 226, 211, 179, 161, 139, 121, 107, 84, 69, 55, 45, 29.

Odor description: sandal, woody, creamy.

Experimental Data of 4-[3-(methoxymethyl)-2,2-dimethyl-cyclopentyl]-2-methyl-butan-1-ol (Hydrogenated Side Product)

NMR-Data:

¹H NMR (600 MHz, C₆D₆) δ3.51 (m_c, 2H), 3.32 (s, 3H), 3.21 (m_c, 2H), 1.87 (m_c, 2H), 1.75 (m_c, 1H), 1.62 (m_c, 1H), 1.34-1.25 (m, 7H), 0.91 (d, J=6.8 Hz, J=6.7 Hz, 3H), 0.98 (s, 3H), 0.57 (s, 3H).

¹³C NMR (151 MHz, C₆D₆) δ70.03, 68.58, 58.85, 51.71, 50.01, 42.09, 36.26, 32.48, 28.48, 27.06, 26.64, 26.50, 16.88, 15.27.

GC-MS-Data: 213, 196, 181, 153, 112, 95, 81, 69, 55, 45, 29.

Compound 3: 2-Ethyl-4-[3-(methoxymethyl)-2,2-dimethyl-cyclopent-3-en-1-yl]but-2-en-1-ol This compound (compound 3) was obtained after purification via Kugelrohr/bulb-to-bulb distillation (T=110° C., p=0.2 mbar) followed by column chromatography (CH/EE, 5:1) (wt.=6.3 g, yield=32%), using butanal and following the procedure described for compound 1.

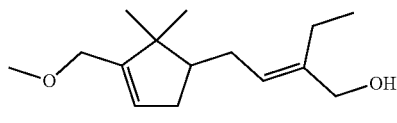 [SMILES: CC/C(=C\CC1CC=C(COC)C1(C)C)CO]

Exact Mass: 238.19
Molecular Formula: C₁₅H₂₆O₂

Experimental Data of 2-ethyl-4-[3-(methoxymethyl)-2,2-dimethyl-cyclopent-3-en-1-yl]but-2-en-1-ol (Compound 3)

NMR-Data:
1H NMR (400 MHz, CDCl$_3$) δ5.60-5.55 (m, 1H), 5.41 (t, J=7.2 Hz, 1H), 4.05 (s, 2H), 3.93 (s, 2H), 3.33 (s, 3H), 2.41-2.32 (m, 1H), 2.24-2.10 (m, 3H), 2.05-1.95 (m, 1H), 1.95-1.79 (m, 2H), 1.06 (s, 3H), 1.01 (t, J=7.6 Hz, 3H), 0.89 (s, 3H).
13C NMR (101 MHz, CDCl$_3$) δ148.71, 140.85, 125.68, 125.41, 69.51, 66.94, 58.09, 51.10, 46.38, 35.70, 27.37, 25.99, 21.11, 20.59, 13.17.
GC-MS: 238, 223, 206, 191, 175, 159, 137, 123, 107, 93, 79, 67, 57.
Odor description: sandal, woody, creamy.

Compound 4: 4-[3-(Methoxymethyl)-2,2-dimethyl-cyclopent-3-en-1-yl]-2-methyl-pent-4-en-1-ol This compound (compound 4) was prepared according to the method described in U.S. Pat. No. 4,610,813 A.

Step 1: Preparation of 2-[3-(methoxymethyl)-2,2-dimethyl-cyclopent-3-en-1-yl]prop-2-enal Firstly, a mixture of Paraformaldehyde (5.62 g, 1.8 eq.) and Dibutylamine (2.69 g, 0.2 eq.) was heated up to 40° C. At this temperature 2-[3-(methoxymethyl)-2,2-dimethyl-cyclopent-3-en-1-yl]acetaldehyde (20.0 g, 1.0 eq.) was added within approximately 10 to 15 min, followed by keeping said temperature at reflux for 30 to 45 min. After the reaction was completed, the mixture was quenched with water, extracted with MTBE (60 ml x3), and the combined organic phases washed with water until a neutral pH was reached. Subsequently, the product was dried with Na$_2$SO$_4$, filtered and the solvent distilled under vacuum to obtain 21.7 g of the raw product, which was used in the next step without further purification.

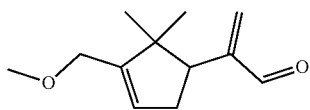

Exact Mass: 194.13
Molecular Formula: C$_{12}$H$_{18}$O$_2$

Experimental Data of 2-[3-(methoxymethyl)-2,2-dimethyl-cyclopent-3-en-1-yl]prop-2-enal NMR-Data:
$^1$H NMR (400 MHz, C$_6$D$_6$) δ9.28 (s, 1H), 5.79-5.73 (m, 1H), 5.57 (tt, J=2.4, 1.4 Hz, 1H), 5.46-5.40 (m, 1H), 3.77-3.73 (m, 2H), 3.34 (td, J=8.1, 1.0 Hz, 1H), 3.10 (s, 3H), 2.19 (dq, J=8.2, 2.1 Hz, 2H), 1.17 (s, 3H), 0.75 (s, 3H).
$^{13}$C NMR (101 MHz, C$_6$D$_6$) δ194.11, 151.03, 148.11, 134.52, 124.86, 69.63, 57.83, 47.89, 47.63, 34.80, 26.97, 22.42.
GC-MS-Data: 194, 179, 162, 147, 133, 119, 105, 91, 77, 67, 53, 41, 29.

Step 2: Preparation of 2-[3-(methoxymethyl)-2,2-dimethyl-cyclopent-3-en-1-yl]prop-2-en-1-ol To a suspension of LAH (2.9 gm, 0.67 eq.) in anhydrous THF (100 ml) 2-[3-(methoxymethyl)-2,2-dimethyl-cyclopent-3-en-1-yl]prop-2-en-1-yl]prop-2-enal (21.7 g) in anhydrous THF (25 mL) was slowly added at a temperature of about 0 to 5° C. The reaction was maintained at room temperature, until the reaction was completed (ca. 4 h). Subsequently, the reaction mixture was quenched with ice water. The resulting salt was reacted with 25% H$_2$SO$_4$ (25 mL), extracted using MTBE (20 mL x3), and the organic phase washed with saturated NaHCO$_3$ solution (50 mL). Thereafter, the combined organic phases have been washed with water until a neutral pH was reached, dried with Na$_2$SO$_4$, filtered and the solvent distilled under vacuum to obtain the raw product (18.2 g), which subsequently was purified using Kugelrohr/bulb-to-bulb distillation, in an amount of 17.5 g (81.4%) (purification in two steps).

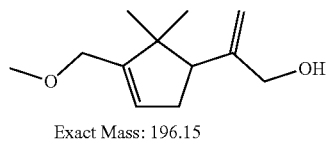

Exact Mass: 196.15
Molecular Formula: C$_{12}$H$_{20}$O$_2$

Experimental Data of 2-[3-(methoxymethyl)-2,2-dimethyl-cyclopent-3-en-1-yl]prop-2-en-1-ol NMR-Data:
$^1$H NMR (400 MHz, CDCl$_3$) δ5.66-5.62 (m, 1H), 5.27-5.22 (m, 1H), 5.02-5.00 (m, 1H), 4.19-4.04 (m, 2H), 3.93-3.90 (m, 2H), 3.34 (s, 3H), 2.65 (t, J=8.5 Hz, 1H), 2.48-2.30 (m, 2H), 1.13 (s, 3H), 0.86 (s, 3H).
$^{13}$C NMR (101 MHz, CDCl$_3$) δ148.88, 147.67, 125.37, 111.03, 69.49, 66.23, 58.11, 54.36, 47.27, 34.05, 26.95, 21.72.
GC-MS-Data: 196, 181, 163, 131, 105, 91, 79, 67, 55, 41, 29.
Odor description: fresh, fruity, weak.

Step 3: Preparation of ethyl-4-[3-(methoxymethyl)-2,2-dimethyl-cyclopent-3-en-1-yl]-2-methyl-pent-4-enoate A mixture of 2-[3-(methoxymethyl)-2,2-dimethyl-cyclopent-3-en-1-yl]prop-2-en-1-ol (5.0 g, 1.0 eq.), Trimethylorthopropionate (13.5 gm, 3.0 eq.) and 2,2-dimethylpropionic acid (0.26 g, 0.1 eq.) was refluxed until the reaction was completed (ca. 3 to 4 h), quenched with water, the compound extracted with MTBE (25 ml x3), the combined organic phases washed with water until a neutral pH was reached, dried with Na$_2$SO$_4$, filtered and the solvent distilled under vacuum to obtain the raw product as an isomeric mixture (6.7 g), which was used in the next step without purification.

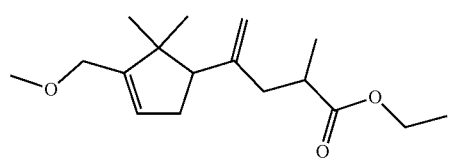

Exact Mass: 280.2
Molecular Formula: C$_{17}$H$_{28}$O$_3$

Experimental Data of ethyl-4-[3-(methoxymethyl)-2,2-dimethyl-cyclopent-3-en-1-yl]-2-methyl-pent-4-enoate NMR-Data:
$^1$H NMR (600 MHz, CDCl$_3$) δ5.64-5.61 (m, 2H), 4.91 (dq, J=13.1, 1.2 Hz, 2H), 4.90 (d, J=16.9 Hz, 2H), 4.15-4.07 (m, 4H), 3.93-3.90 (m, 4H), 3.33 (s, 6H), 2.74-2.69 (m, 1H), 2.69-2.63 (m, 1H), 2.63-2.59 (m, 1H), 2.59-2.55 (m, 1H), 2.52-2.46 (m, 2H), 2.44-2.38 (m, 2H), 2.34-2.25 (m, 2H), 2.14-2.07 (m, 2H), 1.26-1.22 (m, 6H), 1.18 (d, J=7.0 Hz, 3H), 1.16 (s, 6H), 1.13 (d, J=6.9 Hz, 3H), 0.85 (s, 3H), 0.84 (s, 3H).
$^{13}$C NMR (151 MHz, CDCl$_3$) δ176.64, 176.44, 147.68, 147.57, 146.57, 146.39, 125.42, 125.22, 112.75, 112.19, 69.54, 60.25, 60.15, 58.44, 58.09, 58.07, 56.51, 56.13, 47.40, 47.36, 41.41, 40.83, 38.52, 38.09, 34.32, 34.27, 27.09, 27.02, 21.74, 21.69, 17.63, 16.92, 14.29, 14.24.
GC-MS-Data: 280, 248, 203, 174, 147, 119, 105, 91, 79, 41, 29.

Step 4: Preparation of 4-[3-(methoxymethyl)-2,2-dimethyl-cyclopent-3-en-1-yl]-2-methyl-pent-4-en-1-ol, as isomeric mixture (2:1), (compound 4)

To a suspension of LAH (0.6 gm) in anhydrous THF (40 ml) ethyl-4-[3-(methoxymethyl)-2,2-dimethyl-cyclopent-3-en-1-yl]-2-methyl-pent-4-enoate (6.7 g) in anhydrous THF (10 mL) was slowly added at a temperature of 0 to 5° C. The reaction was maintained at room temperature, until the reaction was completed (ca. 4 h). Thereafter, the reaction mixture was quenched with ice water, the generated salt was decomposed using 25% H$_2$SO$_4$ (5 mL), the compound extracted using MTBE (20 mL×3), and the organic phase washed with saturated NaHCO$_3$ solution (50 mL). Afterwards, the combined organic phases were washed with water until a neutral pH was reached, dried with Na$_2$SO$_4$, filtered and the solvent distilled under vacuum to obtain the raw product (5.2 g), which was purified by column chromatography (cyclohexane:ethylacetate 5:1→1:1), resulting in 2.9 g (48%, over two steps) of the final product (compound 4).

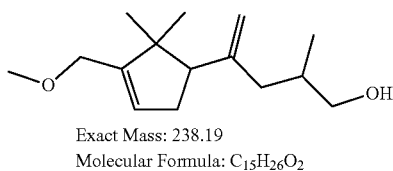

Exact Mass: 238.19
Molecular Formula: C$_{15}$H$_{26}$O$_2$

Experimental Data of 4-[3-(methoxymethyl)-2,2-dimethyl-cyclopent-3-en-1-yl]-2-methyl-pent-4-en-1-ol, as Isomeric Mixture (2:1), (Compound 4)

NMR-Data:
$^1$H NMR (600 MHz, CDCl$_3$) δ5.64-5.58 (m, 2H), 4.96-4.91 (m, 4H), 3.93-3.90 (m, 2H), 3.90-3.87 (m, 2H), 3.53 (dd, J=10.5, 5.6 Hz, 1H), 3.47 (dd, J=10.5, 6.0 Hz, 2H), 3.43 (dd, J=10.7, 5.9 Hz, 1H), 3.33 (s, 3H), 3.33-3.32 (m, 3H), 2.66-2.62 (m, 1H), 2.62-2.57 (m, 1H), 2.46-2.39 (m, 2H), 2.32-2.21 (m, 3H), 2.19-2.10 (m, 1H), 1.97-1.92 (m, 2H), 1.92-1.86 (m, 1H), 1.86-1.81 (m, 1H), 1.16 (s, 3H), 1.15 (s, 3H), 0.95 (d, J=6.6 Hz, 3H), 0.88 (d, J=6.5 Hz, 3H), 0.85 (s, 3H), 0.84 (s, 3H).
$^{13}$C NMR (151 MHz, CDCl$_3$) δ147.96, 147.64, 147.59, 147.31, 125.41, 125.38, 112.49, 112.32, 69.54, 69.24, 69.21, 68.49, 68.09, 58.06, 56.22, 55.69, 47.38, 47.31, 41.84, 41.36, 34.44, 34.30, 34.22, 34.06, 27.16, 27.05, 21.81, 21.76, 17.27, 16.32.
GC-MS-data: 238, 223, 206, 191, 163, 147, 133, 119, 105, 91, 80, 67, 55, 41.
Odor description: woody, sandal, creamy.

Compound 5: 4-[3-(Methoxymethyl)-2,2-dimethyl-cyclo-pentyl]-2-methyl-but-2-en-1-ol

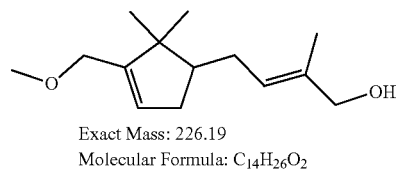

Exact Mass: 226.19
Molecular Formula: C$_{14}$H$_{26}$O$_2$

This title compound was obtained from 2-[3-(methoxymethyl)-2,2-dimethyl-cyclopentyl]acetaldehyde, adapting the procedure for compound 1 in an amount of 15.9 g (yield=52%).

Experimental Data of 4-[3-(methoxymethyl)-2,2-dimethyl-cyclopentyl]-2-methyl-but-2-en-1-ol (Compound 5)

NMR-Data:
$^1$H NMR (400 MHz, CDCl$_3$) δ5.41 (tq, J=7.2, 1.4 Hz, 1H), 4.01-3.97 (m, 2H), 3.45 (dd, J=9.2, 5.2 Hz, 1H), 3.33 (s, 3H), 3.21 (dd, J=9.1, 7.8 Hz, 1H), 2.13 (dddd, J=13.9, 6.9, 3.2, 0.7 Hz, 1H), 1.87-1.72 (m, 4H), 1.68-1.65 (m, 3H), 1.52-1.39 (m, 2H), 1.33-1.16 (m, 2H), 1.02 (s, 3H), 0.61 (s, 3H).
$^{13}$C NMR (101 MHz, CDCl$_3$) δ134.52, 126.12, 74.97, 69.13, 58.86, 51.52, 49.82, 42.04, 28.41, 27.83, 26.68, 26.37, 15.25, 13.74.
GC-MS-Data: 208, 193, 176, 161, 140, 121, 109, 95, 81, 67, 55, 45, 29.
Odor description: woody, weaker than compound 3.

Compound 6: 4-[1-(Methoxymethyl)-2,2-dimethyl-3-bicyclo[3.1.0]hexan-yl]-2-methyl-but-2-en-1-ol Step 1: Preparation of ethyl-4-[1-(methoxymethyl)-2,2-dimethyl-3-bicyclo[3.1.0]hexanyl]-2-methyl-but-2-enoate To a suspension of NaH (1.5 g, 6.25 mmol) in anhydrous THF (50 mL), triethyl 2-phosphonopropionate (5.9 g, 24.8 mmol) was added at room temperature (exothermic reaction, temperature increased up to 29° C.). The reaction mixture was cooled with ice water and maintained at room temperature for one hour, then 2-[1-methoxymethyl]-2,2-dimethyl-3-bicyclo[3.1.0]hexanyl]acetaldehyde [described in He/v. Chimica Acta, 1998, 81, 1349-1358] (5.0 g, 25.5 mmol) was slowly and dropwise added to the reaction mixture which was cooled using an ice bath (due to the exothermic reaction). The reaction was maintained at room temperature until the reaction was completed (ca. 3 h). Thereafter, the reaction mixture was quenched with cold water, the compound extracted using MTBE (100 mL x3), the organic phase washed with water (60 mL x4), dried with Na$_2$SO$_4$, filtered and the solvent distilled under vacuum to obtain the raw product (5.7 g), which was used in the following step without further purification.

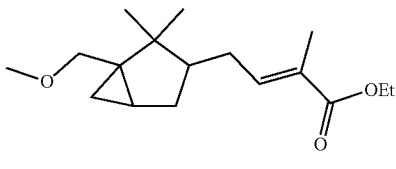

Exact Mass: 280.2
Molecular Formula: $C_{17}H_{28}O_3$

Experimental Data of ethyl-4-[1-(methoxymethyl)-2,2-dimethyl-3-bicyclo[3.1.0]hexanyl]-2-methyl-but-2-enoate NMR-Data:
$^1$H NMR (600 MHz, CDCl$_3$) δ6.70 (tq, J=7.6, 1.5 Hz, 1H), 4.18 (q, 2H), 3.83 (dd, J=10.5, 1.5 Hz, 1H), 3.31 (s, 3H), 2.97 (d, J=10.4 Hz, 1H), 2.14 (ddd, J=14.8, 7.3, 4.1 Hz, 1H), 1.94-1.89 (m, 1H), 1.82 (s, 3H), 1.79 (dd, J=12.3, 6.8 Hz, 1H), 1.42 (td, J=11.8, 4.2 Hz, 1H), 1.33-1.22 (m, 4H), 1.07-1.04 (m, 4H), 0.92 (s, 3H), 0.64 (ddd, J=5.3, 3.8, 1.4 Hz, 1H), 0.40 (dd, J=8.1, 5.2 Hz, 1H).
$^{13}$C NMR (151 MHz, CDCl$_3$) δ168.23, 141.81, 127.69, 76.23, 60.40, 58.52, 44.95, 41.45, 35.13, 32.05, 28.97, 24.83, 19.73, 19.64, 14.31, 12.51, 12.40.
GC-MS-Data: 280, 265, 235, 219, 189, 161, 121, 99, 79, 67, 45, 29.

Step 2: Preparation of 4-[1-(methoxymethyl)-2,2-dimethyl-3-bicyclo[3.1.0]hexanyl]-2-methyl-but-2-enal A solution of NaOH (0.14 g, 0.15 eq.) in methanol (15 ml) was slowly added to 2-[1-(methoxymethyl)-2,2-dimethyl-3-bicyclo[3.1.0]hexanyl]acetaldehyde (5.0 g, 25.5 mmol), which was cooled using an ice bath, followed by the addition of propanal (2.7 g, 2.0 eq). The reaction was maintained at room temperature until completion (ca. 5 h). Thereafter, the reaction mixture was quenched with ice water, the as-obtained compound extracted using MTBE (30 ml x3), the organic phase washed with water (30 ml x2), dried with Na$_2$SO$_4$, filtered and the solvent distilled under vacuum to obtain the raw product (6.5 g), which was used in the following without further purification.

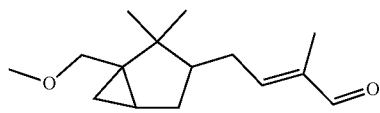

Exact Mass: 236.18
Molecular Formula: $C_{15}H_{24}O_2$

Experimental Data of 4-[1-(methoxymethyl)-2,2-dimethyl-3-bicyclo[3.1.0]hexan-yl]-2-methyl-but-2-enal NMR-Data:
$^1$H NMR (400 MHz, C$_6$D$_6$) δ9.30 (s, 1H), 5.88-5.80 (m, 1H), 3.65 (dd, J=10.3, 1.4 Hz, 1H), 3.11 (s, 3H), 2.80 (d, J=10.3 Hz, 1H), 1.94-1.86 (m, 1H), 1.75-1.66 (m, 1H), 1.64 (s, 3H), 1.54 (dd, J=12.2, 6.8 Hz, 1H), 1.23-1.13 (m, 1H), 1.07 (s, 3H), 1.06-1.01 (m, 1H), 0.95 (dd, J=8.2, 4.2 Hz, 1H), 0.82 (s, 3H), 0.54-0.50 (m, 1H), 0.41 (dd, J=8.0, 5.1 Hz, 1H).
$^{13}$C NMR (101 MHz, C$_6$D$_6$) δ193.95, 152.79, 139.58, 75.85, 58.27, 45.04, 41.64, 35.37, 32.22, 29.24, 25.00, 19.85, 19.74, 12.82, 9.30.
GC-MS-Data: 221, 191, 153, 99, 79, 67, 45, 29.

Step 3: Preparation of 4-[1-(methoxymethyl)-2,2-dimethyl-3-bicyclo[3.1.0]hexanyl]-2-methyl-but-2-en-1-ol (Compound 6)

This compound can be prepared by two methods: 1) LAH reduction (as described for compound 1): The reduction of ethyl-4-[1-(methoxymethyl)-2,2-dimethyl-3-bicyclo[3.1.0]hexanyl]-2-methyl-but-2-enoate resulted in 3.6 g, which is equal to a (overall) yield=55% of compound 6; or 2) Reduction of 4-[1-(methoxymethyl)-2,2-dimethyl-3-bicyclo[3.1.0]hexanyl]-2-methyl-but-2-enal which resulted in 2.5 gm, yield=38% of compound 6.

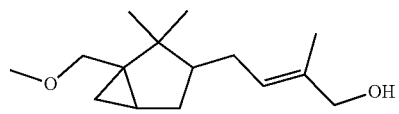

Exact Mass: 238.19
Molecular Formula: $C_{15}H_{26}O_2$

Experimental Data of 4-[1-(methoxymethyl)-2,2-dimethyl-3-bicyclo[3.1.0]hexanyl]-2-methyl-but-2-en-1-ol (Compound 6)

NMR-Data:
$^1$H NMR (400 MHz, CDCl$_3$) δ5.36 (th, J=7.2, 1.2 Hz, 1H), 3.98 (s, 2H), 3.83 (dd, J=10.4, 1.5 Hz, 1H), 3.31 (s, 3H), 2.96 (d, J=10.5 Hz, 1H), 2.02 (ddd, J=14.0, 7.2, 4.2 Hz, 1H), 1.77 (dd, J=12.4, 6.8 Hz, 1H), 1.72 (d, J=7.2 Hz, 1H), 1.67-1.64 (m, 3H), 1.40 (td, J=12.0, 4.2 Hz, 1H), 1.20 (tt, J=10.9, 7.1, 4.5 Hz, 1H), 1.04 (s, 3H), 1.03 (dd, J=7.2, 3.8 Hz, 1H), 0.90 (s, 3H), 0.63 (td, J=4.5, 3.7, 1.4 Hz, 1H), 0.38 (dd, J=8.1, 5.0 Hz, 1H).
$^{13}$C NMR (101 MHz, CDCl$_3$) δ134.6, 126.0, 76.3, 69.1, 58.5, 45.5, 41.3, 35.3, 32.0, 27.8, 24.9, 19.7, 19.6, 13.7, 12.5.
GC-MS-Data: 238, 220, 193, 175, 147, 121, 99, 79, 67, 55, 43.
Odor description: woody, weaker than compound 3.

Compound 7: 2-Ethyl-4-[1-(methoxymethyl)-2,2-dimethyl-3-bicyclo[3.1.0]hexanyl]but-2-en-1-ol Step 1: Preparation of 2-ethyl-4-[1-(methoxymethyl)-2,2-dimethyl-3-bicyclo[3.1.0]hexanyl]but-2-enal A solution of NaOH (0.15 g, 0.15 eq.) in methanol (15 ml) was slowly added to 2-[1-(methoxymethyl)-2,2-dimethyl-3-bicyclo[3.1.0]hexanyl]acetaldehyde (5.0 g, 25.5 mmol). The reaction was cooled in an ice bath. Subsequently, butanal (3.6 g, 2.0 eq.) was added. The reaction was kept at room temperature (ca. 5 h), until the reaction was completed. Thereafter, the reaction mixture was quenched with ice water, the compound extracted using MTBE (30 ml x3), the organic phase washed with water (30 ml x2), dried with Na$_2$SO$_4$, filtered and the solvent distilled under vacuum to obtain the raw product (6.4 g), which was used in the further synthesis without further purification.

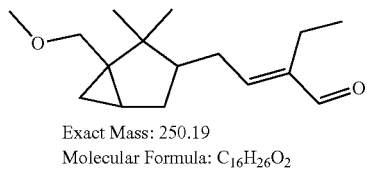

Exact Mass: 250.19
Molecular Formula: C$_{16}$H$_{26}$O$_2$

Experimental Data of 2-ethyl-4-[1-(methoxymethyl)-2,2-dimethyl-3-bicyclo [3.1.0]hexanyl]but-2-enal GC MS-Data: 221, 191, 153, 99, 79, 67, 45, 29.

Step 2: Preparation of 2-ethyl-4-[1-(methoxymethyl)-2,2-dimethyl-3-bicyclo [3.1.0] hexanyl]but-2-en-1-ol (Compound 7)

To a suspension of LAH (0.67 gm, 0.67 eq.) in anhydrous THF (75 ml), as-obtained 2-ethyl-4-[1-(methoxymethyl)-2,2-dimethyl-3-bicyclo[3.1.0]hexanyl]but-2-enal (6.4 g) in anhydrous THF (55 ml) was slowly added at a temperature of 0 to 5° C. The reaction was kept at room temperature until completion (ca. 4 h). Thereafter, the reaction mixture was quenched with ice water, the obtained salt was decomposed using 25% H$_2$SO$_4$ (2 mL), the resulting product extracted using MTBE (50 mL x3) and the organic phase washed with saturated NaHCO$_3$ solution (50 mL). Then, the combined organic phases were washed with water until a neutral pH was reached, dried with Na$_2$SO$_4$, filtered and the solvent distilled under vacuum to obtain the raw product (6.0 g), which was purified via Kugelrohr distillation (temperature=170 to 190° C., vacuum=0.3 mbar) to obtain 3.1 g of the product (overall yield=48%), along with a minor amount of the isomerized product, 4-[3-(methoxymethyl)-2,2-dimethyl-cyclopent-3-en-1-yl]-2-methyl-but-3-en-1-ol (65:25).

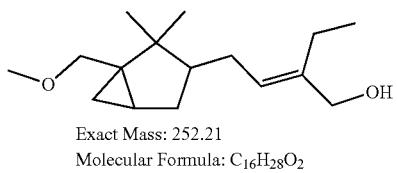

Exact Mass: 252.21
Molecular Formula: C$_{16}$H$_{28}$O$_2$

Experimental Data of 2-ethyl-4-[1-(methoxymethyl)-2,2-dimethyl-3-bicyclo [3.1.0]hexanyl]but-2-en-1-ol (Compound 7)

NMR-Data:
$^1$H NMR (600 MHz, CDCl$_3$) δ0.35-0.42 (dd, J=8.3, 5.1 Hz, 1H), 0.60-0.67 (m, 1H), 0.89-0.92 (s, 3H), 0.96-1.02 (t, J=7.6 Hz, 3H), 1.02-1.08 (m, 1H), 1.03-1.06 (s, 3H), 1.14-1.23 (tdd, J=11.9, 10.7, 6.7, 3.8 Hz, 1H), 1.35-1.45 (td, J=11.9, 4.2 Hz, 1H), 1.70-1.81 (ddd, J=14.1, 10.7, 7.3 Hz, 1H), 1.75-1.82 (dd, J=11.9, 6.7 Hz, 1H), 2.01-2.08 (ddd, J=14.1, 7.2, 3.8 Hz, 1H), 2.07-2.13 (q, J=7.6 Hz, 2H), 2.93-2.99 (d, J=10.5 Hz, 1H), 3.28-3.32 (s, 3H), 3.81-3.86 (dd, J=10.5, 1.4 Hz, 1H), 4.01-4.04 (d, J=4.4 Hz, 2H), 5.29-5.34 (t, J=7.2 Hz, 1H).

$^{13}$C NMR (151 MHz, CDCl$_3$) δ140.50, 125.93, 76.28, 66.93, 58.51, 45.64, 41.44, 35.25, 32.08, 27.44, 24.89, 21.03, 19.75, 19.61, 13.19, 12.52.

Odor description: woody, weaker than compound 3.

Compound 8: 1-[2-[[1-(methoxymethyl)-2,2-dimethyl-3-bicyclo[3.1.0]hexanyl]methyl]-1-methyl-cyclopropyl]ethanol Step 1: Preparation of 2-[[1-(methoxymethyl)-2,2-dimethyl-3-bicyclo[3.1.0]hexanyl]methyl]-1-methyl-cyclopropanecarbaldehyde

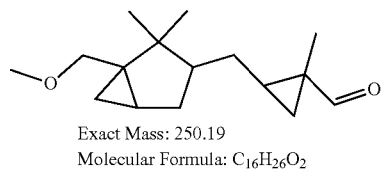

Exact Mass: 250.19
Molecular Formula: C$_{16}$H$_{26}$O$_2$

To a suspension of NaH (2.13 g, 2.0 eq) in hexane (60 ml), Trimethylsulfoxoniumiodide (11.7 g, 2.0 eq.) in DMSO (40 ml) was slowly added (exothermic reaction: T<30° C.), followed by slow addition of 4-[1-(methoxymethyl)-2,2-dimethyl-3-bicyclo[3.1.0]hexanyl]-2-methyl-but-2-enal (9.0 g, 38.14 mmol), (exothermic reaction: T<38° C.). After slow cooling, the reaction mixture temperature was brought to room temperature, and the temperature kept until the reaction was completed (ca. 4 h). Thereafter, the reaction mixture was quenched with ice water, the resulting compound extracted using MTBE (50 ml x3) and the organic phase washed with saturated NaCl solution (50 ml). Afterwards, the combined organic phases were washed with water until a neutral pH was reached, dried with Na$_2$SO$_4$, filtered and the solvent distilled under vacuum to obtain the raw material (9.1 g), which, after Kugelrohr distillation (T=240 C, p=1.1 mbar), resulted in 9.0 g of the intermediate product.

Step 2: Preparation of 1-[2-[[1-(methoxymethyl)-2,2-dimethyl-3-bicyclo[3.1.0]hexanyl]methyl]-1-methyl-cyclopropyl]ethanol (Compound 8)

To a suspension of LAH (0.74 gm, 0.67 eq.) in anhydrous THF (25 ml), as-obtained 2-[[1-(methoxymethyl)-2,2-dimethyl-3-bicyclo[3.1.0]hexanyl]methyl]-1-methyl-cyclopropane carbaldehyde (4.8 g, 1.0 eq.) in anhydrous THF (25 ml) was slowly added at a temperature of 0 to 5° C. The reaction was kept at room temperature until completion (ca. 3 h). Afterwards, the reaction mixture was quenched with ice water, the generated salt was decomposed using 25% H$_2$SO$_4$ (2 ml), the compound extracted using MTBE (50 mL x3), and the organic phase washed with saturated NaHCO$_3$ solution (50 ml). The combined organic phases were washed with water until a neutral pH was reached, dried with Na$_2$SO$_4$, filtered and the solvent distilled under vacuum to obtain the raw material (4.3 g), which was purified by column chromatography (cyclohexane:ethylacetate; 10:1) to give an isomeric mixture (7:3) 1-[2-[[1-(methoxymethyl)-2,2-dimethyl-3-bicyclo[3.1.0]hexanyl]methyl]-1-methylcyclo-propyl]ethanol (1.2 g, yield=25%).

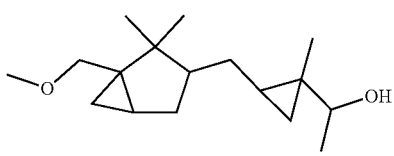

Exact Mass: 266.22
Molecular Formula: $C_{17}H_{30}O_2$

Experimental Data of 1-[2-[[1-(methoxymethyl)-2,2-dimethyl-3-bicyclo[3.1.0]hexanyl]methyl]-1-methyl-cyclopropyl]ethanol (Compound 8)

NMR-Data:
$^1$H NMR (400 MHz, $C_6D_6$) δ3.74 (d, J=10.2 Hz, 1H), 3.28 (q, J=6.5 Hz, 1H), 3.13 (s, 3H), 2.87 (d, J=10.3 Hz, 1H), 1.99 ($m_c$, 1H), 1.56 (ddd, J=13.6, 5.8, 2.7 Hz, 1H), 1.40-1.35 (m, 2H), 1.19 (s, 3H), 1.17 (s, 3H), 1.07 (s, 1H), 0.92 (s, 6H), 0.94 ($m_c$, 1H), 0.72 (td, J=4.8, 1.3 Hz, 1H), 0.69 (td, J=4.8, 1.3 Hz, 1H), 0.39 (tt, J=8.2, 7.5, 5.5 Hz, 1H), 0.28 (t, J=5.7, 4.5 Hz, 1H), 0.26 (t, J=6.0, 4.6 Hz, 1H).
$^{13}$C NMR (101 MHz, $C_6D_6$) δ76.07, 70.38, 70.24, 58.25, 46.56, 45.96, 41.69, 41.49, 35.74, 35.57, 32.71, 32.60, 28.88, 28.31, 26.23, 25.82, 25.70, 25.10, 25.06, 24.45, 20.39, 20.21, 20.16, 20.08, 19.91, 19.78, 18.42, 17.75, 12.94, 12.91.
GC-MS-Data: 266, 251, 233, 203, 165, 147, 121, 99, 79, 55, 43, 29.
Odor description: creamy, blooming, sweet.

The invention claimed is:
1. A compound of general formula (I):

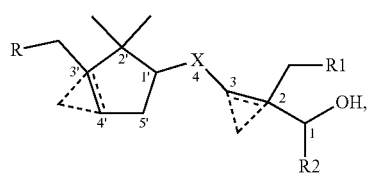

Formula (I)

wherein
R represents an ether group,
R1 represents a hydrogen atom or an alkyl group,
R2 represents a hydrogen atom or an alkyl group, and
X represents a $CH_2$ group or $C=CH_2$ group;
wherein the chain marked as C1 to C4 is either saturated or is unsaturated and contains one double bond either between C2 and C3 or between C3 and C4;
wherein at the position of the dotted lines in the chain between C2 and C3 there is either a noncyclic C—C single bond between C2 and C3, a C=C double bond between C2 and C3 or a cyclopropane ring encompassing C2 and C3; and
wherein at the position of the other dotted lines between C3' and C4' in the 5-C ring there is either a C—C single bond between C3' and C4', a C=C double bond between C3' and C4' or a cyclopropane ring encompassing C3' and C4'; or
a stereoisomer thereof; or
a mixture of any of the above compounds or a mixture of any of the above stereoisomers.

2. The compound according to claim 1, wherein X represents a $CH_2$ group.
3. The compound according to claim 1, wherein the alkyl group of R1 and/or R2 is a methyl group.
4. The compound according to claim 1, wherein at the position of the dotted lines in the 5-C ring there is a C=C double bond.
5. The compound according to claim 1, wherein at the position of the dotted lines in the chain between C2 and C3 there is a C=C double bond.
6. The compound according to claim 1, wherein the compound is selected from the group consisting of the following compounds and their stereoisomers:

| Compound No. | Structure |
| --- | --- |
| 1 | |
| 2 | |
| 3 | |
| 4 | |
| 5 | |
| 6 | |
| 7 | |
| 8 | | and mixtures thereof.

7. A compound according to general formula (II):

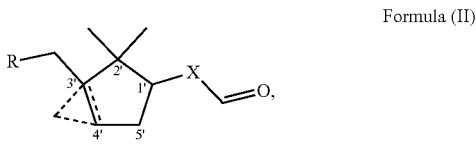

Formula (II)

wherein

R represents an ether group, and

X represents a CH₂ group or C=CH₂ group; and wherein at the position of the dotted lines between C3' and C4' in the 5-C ring there is either a C—C single bond between C3' and C4' or a cyclopropane ring encompassing C3' and C4'; or a stereoisomer thereof; or a mixture of any of the above compounds or a mixture of any of the above stereoisomers.

8. The compound according to claim 7, wherein X represents a CH₂ group.

9. The compound according to claim 7, wherein the compound is selected from the group consisting of the following compounds and their stereoisomers:

| Compound No. | Structure |
| --- | --- |
| A | 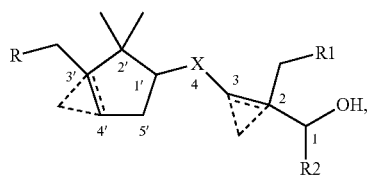 |
| B | | and mixtures thereof.

10. A fragrance composition comprising:

at least one compound according to general formula (I):

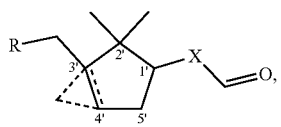

Formula (I)

wherein

R represents an ether group,

R1 represents a hydrogen atom or an alkyl group,

R2 represents a hydrogen atom or an alkyl group, and

X represents a CH₂ group or C=CH₂ group;

wherein the chain marked as C1 to C4 is either saturated or is unsaturated and contains one double bond either between C2 and C3 or between C3 and C4, wherein at the position of the dotted lines in the chain between C2 and C3 there is either a noncyclic C—C single bond between C2 and C3, a C=C double bond between C2 and C3 or a cyclopropane ring encompassing C2 and C3, and wherein at the position of the other dotted lines between C3' and C4' in the 5-C ring there is either a C—C single bond between C3' and C4', a C=C double bond between C3' and C4' or a cyclopropane ring encompassing C3' and C4'; or at least one compound according to general formula (II):

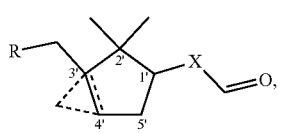

Formula (II)

wherein

R represents an ether group, and

X represents a CH₂ group or C=CH₂ group, and wherein at the position of the dotted lines between C3' and C4' in the 5-C ring there is either a C—C single bond between C3' and C4', or a cyclopropane ring encompassing C3' and C4'; or a stereoisomer of the compound according to general formula (I), or a stereoisomer of the compound according to general formula (II), or a mixture of any of the above compounds, or a mixture of any of the above stereoisomers; and at least one further fragrance substance.

11. The fragrance composition according to claim 10, wherein the fragrance composition serves as an odorant or for improving the fixation of a fragrance compound or for the preparation of a perfumed product.

12. A perfumed product comprising:

a compound according to claim 1; or a compound according to general formula (II):

Formula (II)

wherein

R represents an ether group, and

X represents a CH₂ group or C=CH₂ group, and wherein at the position of the dotted lines between C3' and C4' in the 5-C ring there is either a C—C single bond between C3' and C4' or a cyclopropane ring encompassing C3' and C4'; or a stereoisomer of a compound according to formula (II); or a fragrance composition including the compound according to formula (I), or the compound according to formula (II), or a stereoisomer of the compound according to formula (I), or a stereoisomer of the compound according to formula (II), or a mixture of one or more compounds according to formula (I) or stereoisomers thereof and one or more compounds according to formula (II) or stereoisomers thereof; and at least one further fragrance substance; or a mixture of any of the above compounds, or a mixture of any of the above stereoisomers; and a carrier or substrate.

13. The perfumed product according to claim 12, wherein the perfumed product is a perfume oil, perfume base, formulation for personal hygiene, cleaning agent or laundry agent.

14. A method of preparing a compound according to claim 1, comprising:

using a compound according to general formula (II):

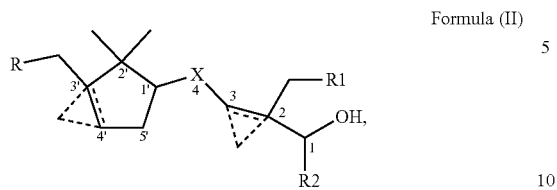

Formula (II)

wherein
R represents an ether group, and
X represents a $CH_2$ group or $C=CH_2$ group, and
wherein at the position of the dotted lines between C3' and C4' in the 5-C ring there is either a C—C single bond between C3' and C4', a C=C double bond between C3' and C4' or a cyclopropane ring encompassing C3' and C4',
or a stereoisomer thereof, in said preparing.

15. The compound of claim 1, wherein the compound serves as an odorant or for improving the fixation of a fragrance compound or for the preparation of a perfumed product.

16. The compound of claim 7, wherein the compound serves as an odorant or for improving the fixation of a fragrance compound or for the preparation of a perfumed product.

* * * * *